US005603013A

United States Patent [19]
Ohara

[11] Patent Number: 5,603,013
[45] Date of Patent: Feb. 11, 1997

[54] METHOD AND APPARATUS FOR NOISE REDUCTION OF CYCLIC SIGNAL BY SELECTING MAJORITY LOGIC STATE OF CORRESPONDING PORTIONS OF PLURAL CYCLES

[75] Inventor: Kazuhiro Ohara, Chiba, Japan

[73] Assignee: Texas Instruments Incorporated, Dallas, Tex.

[21] Appl. No.: 474,216

[22] Filed: Jun. 7, 1995

Related U.S. Application Data

[63] Continuation of Ser. No. 156,544, Nov. 23, 1993, which is a continuation-in-part of Ser. No. 72,605, Jun. 3, 1993, abandoned.

[51] Int. Cl.$^6$ .......................... G06F 9/455; H04N 5/217
[52] U.S. Cl. .......................... 395/500; 371/69.1; 386/34; 386/44
[58] Field of Search .......................... 235/151.3; 358/36, 358/21 R, 167, 141, 105, 320, 326; 340/146.2; 371/69, 36, 69.1; 380/21, 15, 17, 19, 20; 348/473

[56] References Cited

U.S. PATENT DOCUMENTS

| | | | |
|---|---|---|---|
| 3,622,765 | 6/1969 | Anderson | 235/151.3 |
| 4,107,736 | 8/1978 | Lowry et al. | 358/36 |
| 4,227,175 | 10/1980 | Newman | 340/146.2 |
| 4,375,101 | 2/1983 | Cerracchio | 371/69 |
| 4,388,729 | 6/1983 | Spencer et al. | 455/72 |
| 4,464,674 | 8/1984 | Schulz et al. | 358/21 R |
| 4,670,880 | 6/1987 | Jitsukawa et al. | 371/36 |
| 5,091,938 | 2/1992 | Thompson et al. | 380/21 |
| 5,119,197 | 6/1992 | Kuroda | 358/167 |
| 5,166,976 | 11/1992 | Thompson et al. | 380/15 |
| 5,185,794 | 2/1993 | Thompson et al. | 380/17 |
| 5,225,907 | 7/1993 | Casavant et al. | 358/141 |
| 5,235,417 | 8/1993 | Casavant et al. | 358/105 |
| 5,241,548 | 8/1993 | Dillon et al. | 371/69.1 |
| 5,267,312 | 11/1993 | Thompson et al. | 380/19 |
| 5,384,599 | 1/1995 | Casavant et al. | 348/473 |
| 5,406,627 | 4/1995 | Thompson et al. | 380/20 |

*Primary Examiner*—Kevin J. Teska
*Assistant Examiner*—Russell W. Frejd
*Attorney, Agent, or Firm*—Robert D. Marshall, Jr.; James C. Kesterson; Richard L. Donaldson

[57] ABSTRACT

An EDTV application utilizing a Synchronous Vector Processor (SVP) includes the operation whereby noise is reduced in the operation to demodulate the chroma signal. Initially, the NTSC composite video is separated into the luminance (Y) and the chroma (C) signals by a Y/C separator algorithm (272). The chroma signal is then processed through a colorburst calculation algorithm (290). During the colorburst calculation, the phase of the colorburst signal is determined by processing the chroma signal through a phase detector (416) to provide the phase components $S_i$ and $M_i$. Both signals are cyclic signals and are processed in accordance with a majority noise reduction algorithm. The majority noise reduction algorithm is operable to sample a given portion of one of the cycles in the cyclic signal and also sample corresponding portions in adjacent cycles both prior to the present portion and preceding the present portion. A decision as to a logic state of the present portion is made by comparing all of the logic states of the sampled portions and forcing a select portion to the logic state of the majority of the sampled portions. This is then input to a phase shift circuit (414) and then to a demodulator (412) to adjust the phase thereof and output demodulated chroma.

38 Claims, 12 Drawing Sheets

DIR WRITE TIMING WITH RESET WRITE

DOR READ TIMING WITH RESET READ

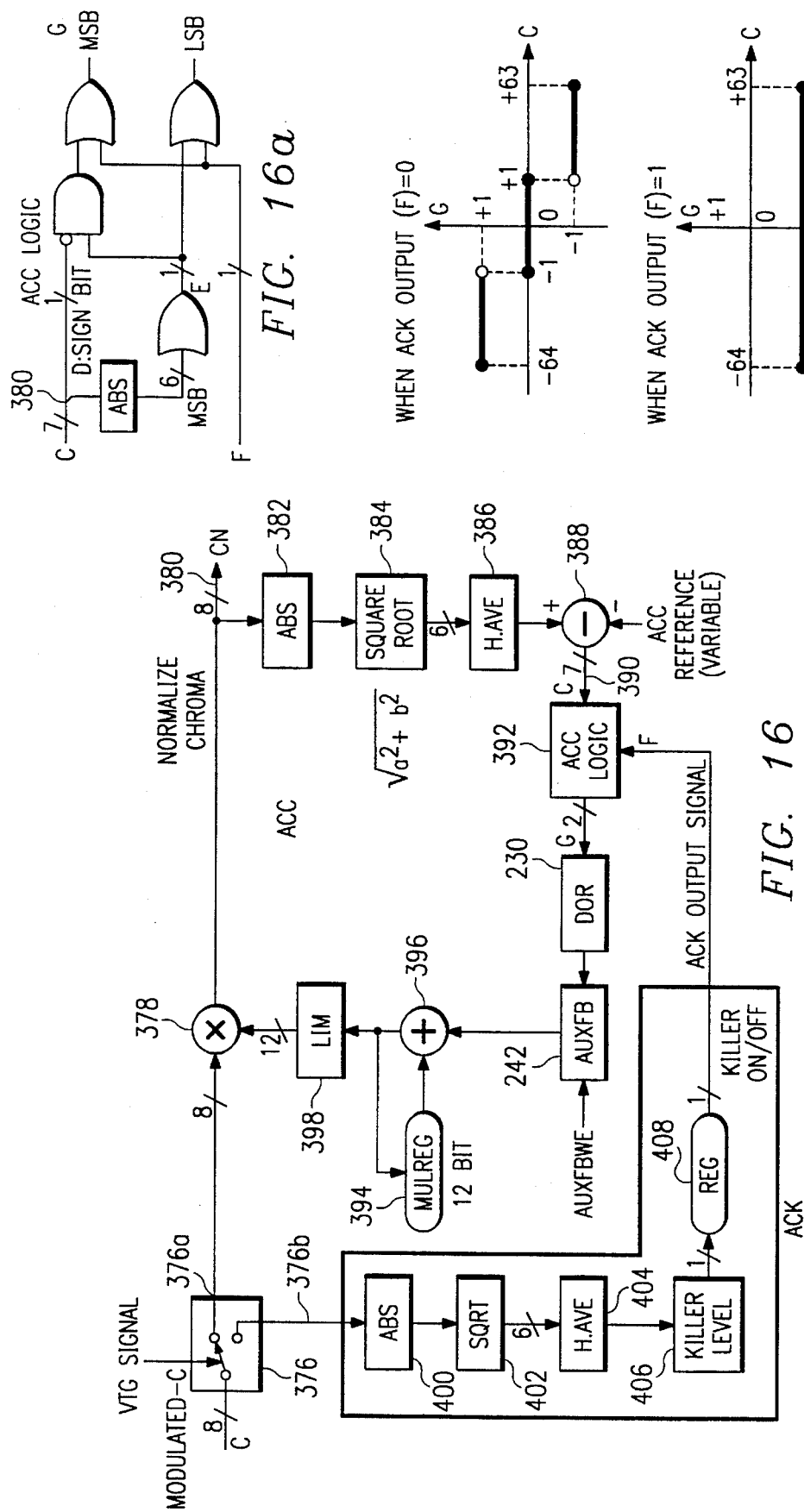

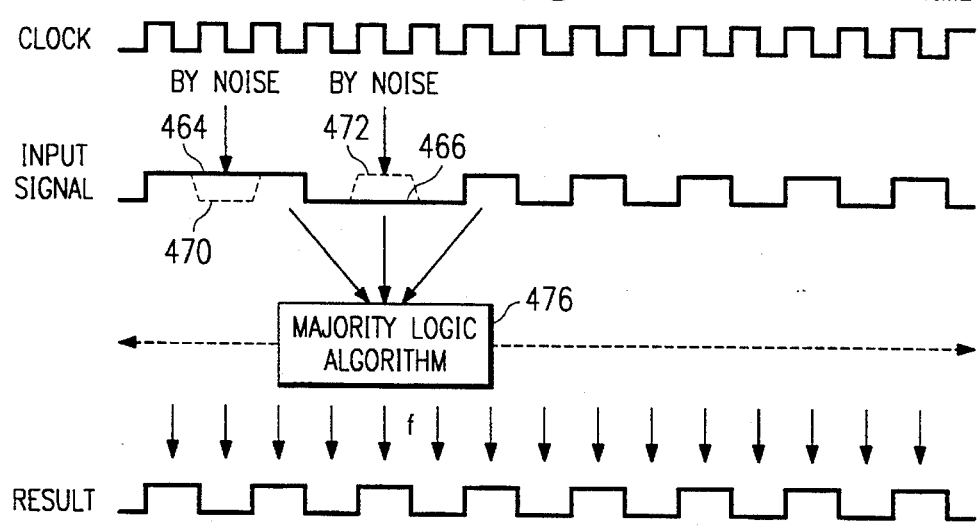
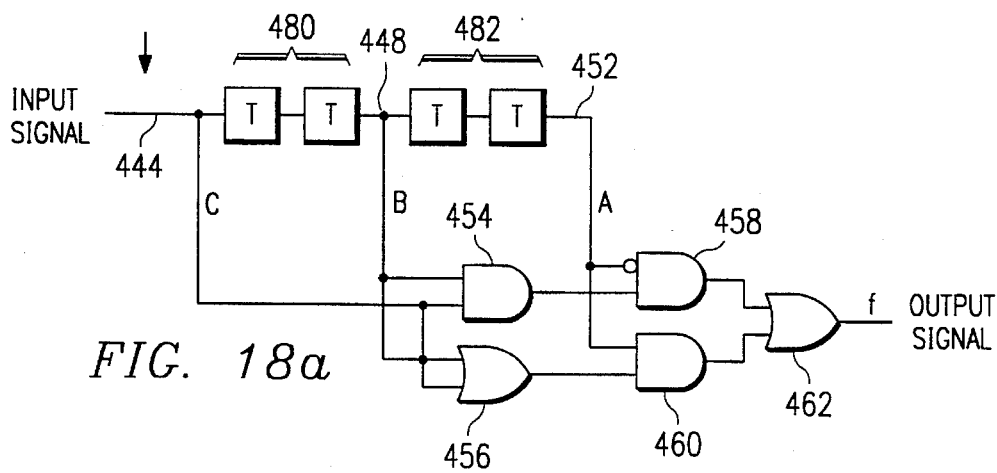
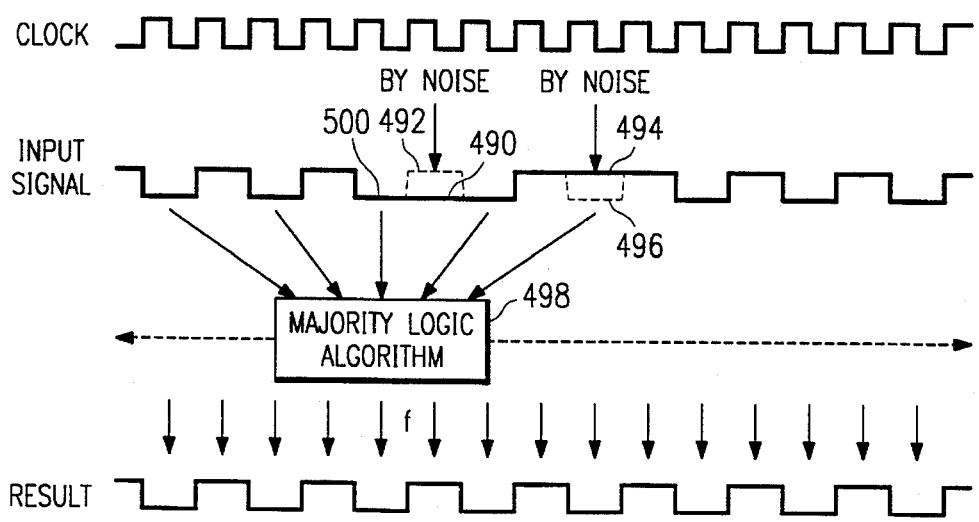

METHOD AND APPARATUS FOR NOISE REDUCTION OF CYCLIC SIGNAL BY SELECTING MAJORITY LOGIC STATE OF CORRESPONDING PORTIONS OF PLURAL CYCLES

CROSS REFERENCE TO RELATED APPLICATIONS

This application is a continuation of U.S. patent application Ser. No. 08/156,544 filed Nov. 23, 1993; which is a continuation in part of U.S. patent application Ser. No. 08/072,605 filed Jun. 3, 1993 and now abandoned and is related to: U.S. Pat. No. 5,321,510 and U.S. Pat. No. 4,939,575, both having a first effective filing data of Nov. 13, 1987; U.S. Pat. No. 5,163,120; U.S. patent application Ser. No. 07/421,487 filed Oct. 13, 1989 and now abandoned; U.S. Pat. No. 5,210,836; U.S. patent application Ser. No. 08/035,519 filed Mar. 22, 1993, a continuation of U.S. patent application Ser. No. 07/421,472 filed Oct. 13, 1989 and now abandoned; U.S. patent application Ser. No. 08/037,467 filed Mar. 25, 1993, a continuation of U.S. patent application No. 07/421,493 filed Oct. 13, 1989 and now abandoned; U.S. patent application Ser. No. 08/234,508 filed Apr. 28, 1994, a continuation of U.S. patent application Ser. No. 08/009,432 filed Jan. 27, 1993 and now abandoned, a continuation of U.S. patent application No. 07/421,488 filed Oct. 13, 1989 and now abandoned; U.S. patent application Ser. No. 08/105,659 filed Aug. 12, 1993, a continuation of U.S. patent application No. 07/421,473 filed Oct. 13, 1989 and now abandoned; U.S. Pat. No. 5,239,637; U.S. patent application Ser. No. 08/163,606 filed Dec. 7, 1993, a continuation of U.S. patent application No. 07/421,494 filed Oct. 13, 1989 and now abandoned; U.S. Pat. No. 5,327,541; U.S. patent application Ser. No. 07/421,471 filed Oct. 13, 1989; and U.S. patent applications Ser. No. 08/059,165 filed May 7, 1993 and entitled "Hardware Interrupt and Dual-Pointer Global Rotation for Synchronous Operation in Video Signal Processing"; all of which are assigned to Applicant's assignee and the contents of said related cases are hereby incorporated herein by reference.

NOTICE: COPYRIGHT© 1993 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to single instruction, multiple data processors. More particularly, the invention relates to processors having a One dimensional array of processing elements, that finds particular application in digital signal processing such as Improved Definition Television (IDTV). Additionally, the invention relates to improvements to the processors, television and video systems, communication systems and other systems improvements and methods of their operation and control, particularly the chroma demodulation operation.

BACKGROUND OF THE INVENTION

Fast and accurate real-time processing of data signals is desirable in general purpose digital signal processing, consumer electronics, industrial electronics, graphics and imaging, instrumentation, medical electronics, military electronics, communications and automotive electronics applications among others, to name a few broad technological areas. In general, video signal processing, such as real-time image processing of video signals, requires massive data handling and processing in a short time interval. Image processing is discussed by Davis et al. in Electronic Design, Oct. 31, 1984, pp. 207–218, and issues of Electronic Design for, Nov. 15, 1984, pp. 289–300, Nov. 29, 1984, pp. 257–266, Dec. 13, 1984, pp. 217–226, and Jan. 10, 1985, pp. 349–356.

Video signal processing requires the use of Finite Impulse Response (FIR) digital filters for many of the data processing applications. If the sampling frequency is carefully selected, the coefficients of the filters can be small ratios of powers of two or at least simple combinations of powers of two. Real time video signal processing requires that the operating processors receive and process the video signal and the data necessary to emulate digital filters at extremely fast rates. In the prior art a substantial portion of the processing time is consumed in obtaining the sample data from adjacent processors in the array. For example the processors in the array would have to execute a series of instructions to address, read and transfer data located in its next adjacent processor until it reaches the desired location in the array. In a large array, this sequence of transferring the data from one processor to the next until it reaches a desired location is time consuming. If a finite time exists to receive and process the data, a large data retrieval time will of course leave less time for data processing. One technique for performing this processing is to utilize a Scan-line Video Processor (SVP), described in U.S. Pat. No. 5,163,120, assigned to the present Assignee.

A typical SVP is operable to receive a single scan line from a video output between two horizontal blanking periods and then store this in a Data Input Register (DIR). This dam is then transferred to a processing element (PE) during a horizontal blanking period, and an algorithm applied thereto during a horizontal sync period, and on a following horizontal blanking period, the processed data is then transferred to a Data Output Register (DOR). The operation is done on a concurrent line-by-line operation and in a synchronized manner. The data transfer from the DIR to the PE must be performed during a horizontal blanking period of the input signal; otherwise, current data and prior data from the previous horizontal scan line in the DIR is read by the PE.

In the application of the SVP to video processing, one algorithm that must be processed is that for performing the chroma demodulation. In processing a conventional demodulation algorithm, the phase of the color burst signal is first detected by a phase detection algorithm to yield phase detected output signals which are then input to phase shift operation for phase shifting the phase detected outputs and then driving a color demodulation algorithm. The detected signals are cyclic signals which typically have some type of noise reduction algorithm applied thereto. Since the gain of the burst signal is relatively small, i.e., approximately 0.286 Vp–p on an EIA specification, the phase detection operation can be greatly affected by external noise, such that any incorrect detection data is output therefrom. Typically, some type of Low Pass Filter (LPF) or Band Pass Filter (BPF)

operation is applied for the purpose of noise reduction on the phase detected signals. However, only the low and high frequency noise against the frequency of the phase detected signals can be rejected by the LPF or BPF. Therefore, there exists a need for an improved noise reduction technique for use with chroma demodulation in an SVP environment.

SUMMARY OF THE INVENTION

The present invention disclosed and claimed herein comprises a method and apparatus for processing data with a reduced noise level. A data input register is provided for receiving and storing data for later transfer to a processor. The processor is operable to process the transferred data in accordance with a predetermined processing algorithm and generate a binary cyclic signal. The binary cyclic signal has a plurality of cycles associated therewith and is disposed at either a first or a second logic state. The noise in the cyclic signal is then reduced and a reconstructed cyclic signal is generated. The noise is reduced by first dividing each of the cycles into portions and then comparing the logic state of each portion in each cycle to a corresponding portion in at least two other cycles in the cyclic signal. The logic state of the majority of the compared portion is then determined and this constitutes the logic state of the each portion in the reconstructed cyclic signal.

In another aspect of the present invention, the processor is operable to utilize the reconstructed cyclic signal in subsequent processing to yield output processed data in accordance with the predetermined processing algorithm. The output processed data is transferred to a data output register. Further, the processor is comprised of a plurality of processor elements operating in parallel to process the data.

In a further aspect of the present invention, the number of portions compared in the comparison operation is an odd number. Further, the comparison operation is operable to compare a given portion with corresponding portions in at least a preceding cycle and a subsequent cycle. The compared portions are from adjacent cycles.

BRIEF DESCRIPTION OF THE DRAWINGS

For a more complete understanding of the present invention and the advantages thereof, reference is now made to the following description taken in conjunction with the accompanying Drawings in which:

FIG. 16 illustrates an alternate embodiment of the color demodulation operation to convert the modulated chroma to demodulated chroma;

FIG. 16a illustrates a logic diagram of the ACC block;

FIG. 16b illustrates a diagrammatic representation of the function provided by the automatic color control logic of FIG. 15;

FIG. 18 illustrates a timing diagram for a situation where only the positive or negative portion of the cycle is examined;

FIG. 18a illustrates a logic representation of the algorithmic block of FIG. 18;

FIG. 19 illustrates a timing diagram wherein odd tap numbers are utilized; and

DETAILED DESCRIPTION OF THE PREFERRED EMBODIMENTS

Figure 1:
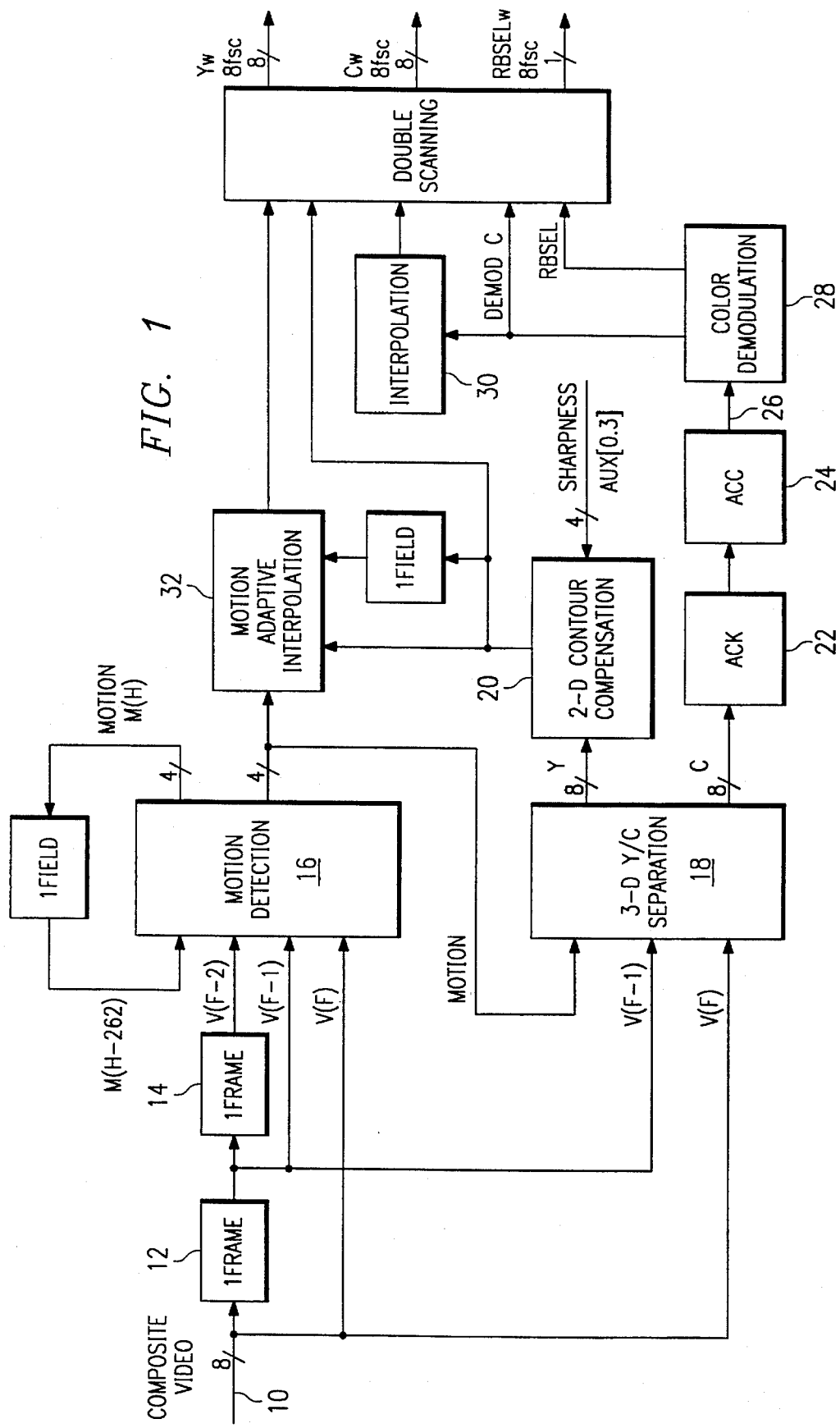
FIG. 1 illustrates a block diagram of an EDTV algorithm.

In the following discussion of the preferred embodiments of the invention, reference is made to drawing figures. Like reference numerals used throughout the several figures refer to like or corresponding pans.

Referring now to FIG. 1, there is illustrated a block diagram of an EDTV algorithm that is implemented with an SVP. An NTSC composite signal is digitized by an analog-to-digital converter (not shown) with a $4f_{sc}$ sampling clock, and input on a line 10, this being an 8-bit input. This provides a signal V(F). The input signal is input through a one frame delay block 12 to provide a signal V(F–1) and this signal is then input through a second one frame delay block 14 to output a signal V(F–2), this being a two frame delay. The input signal on line 10, the one frame delay output of delay block 12 and the two frame delay output of delay block 14 are input to a motion detection block 16 which is operable to detect the motion magnitude in the incoming composite video signal pixel-by-pixel. The output of the motion detection block is input to a 3D Y/C separation block 18, which is operable to separate the input video into luminance (Y) and chroma (C) components by the detected motion magnitude. This provides an 8-bit Y-output and an 8-bit C-output.

The Y-output is input to a contour compensation block 20, which is operable to emphasize the vertical edge of the Y-output. The C-output is input to an ACK block 21, which provides for an automatic chroma killer feature and then this is input to an ACC block 24 to provide for an automatic chroma gain control function. This essentially provides a normalized color output on a line 26. This is input to a color demodulation block 28 to provide a demodulated chroma output. This can be output directly and also processed through an interpolation. block 30. Further, the output of the motion detection block 16 and the output of the contour compensation block 20 can be processed through a motion adaptive interpolation block 32 to provide a progressive scanned conversion operation.

In general, a Scan-line Video Processor (SVP) is utilized to implement the EDTV algorithm of FIG. 1, with two SVPs utilized. One SVP is utilized to provide the motion detection and Y/C separation operation, in addition to the contour compensation. A second SVP is utilized to perform the progressive scan conversion and the color demodulation operation.

The SVP of the preferred embodiment is a general purpose mask-programmable single instruction, multiple data, reduced instruction set computing (SIMD-RISC) device capable of executing in real-time the 3-D algorithms useful in Improved and Extended Definition Television (IDTV and EDTV) systems. Although the SVP of the invention is disclosed for video signal processing in the preferred embodiment, the hardware of the SVP works well in many different applications, so no particular filters or functions are implied in the architecture. Generally, the SVP can be used in any situation in which large numbers of incoming data are to be processed in parallel.

In a typical application, such as video signal processing, the Input and Output layers operate in synchronism with the data source (such as video camera, VCR, receiver, etc.) and the data sink (such as the raster display), respectively. Concurrently, the Computation layer performs the desired transformation by the application of programmable functions simultaneously to all the elements of a packet (commonly referred to as a VECTOR: within the TV/Video environment all the samples comprising a single horizontal display line). Thus the SVP is architecturally streamlined for Synchronous Vector Processing. The SVP is generally described in U.S. Pat. No. 5,163,120, issued Nov. 10, 1992, and incorporated herein by reference.

Figure 2:
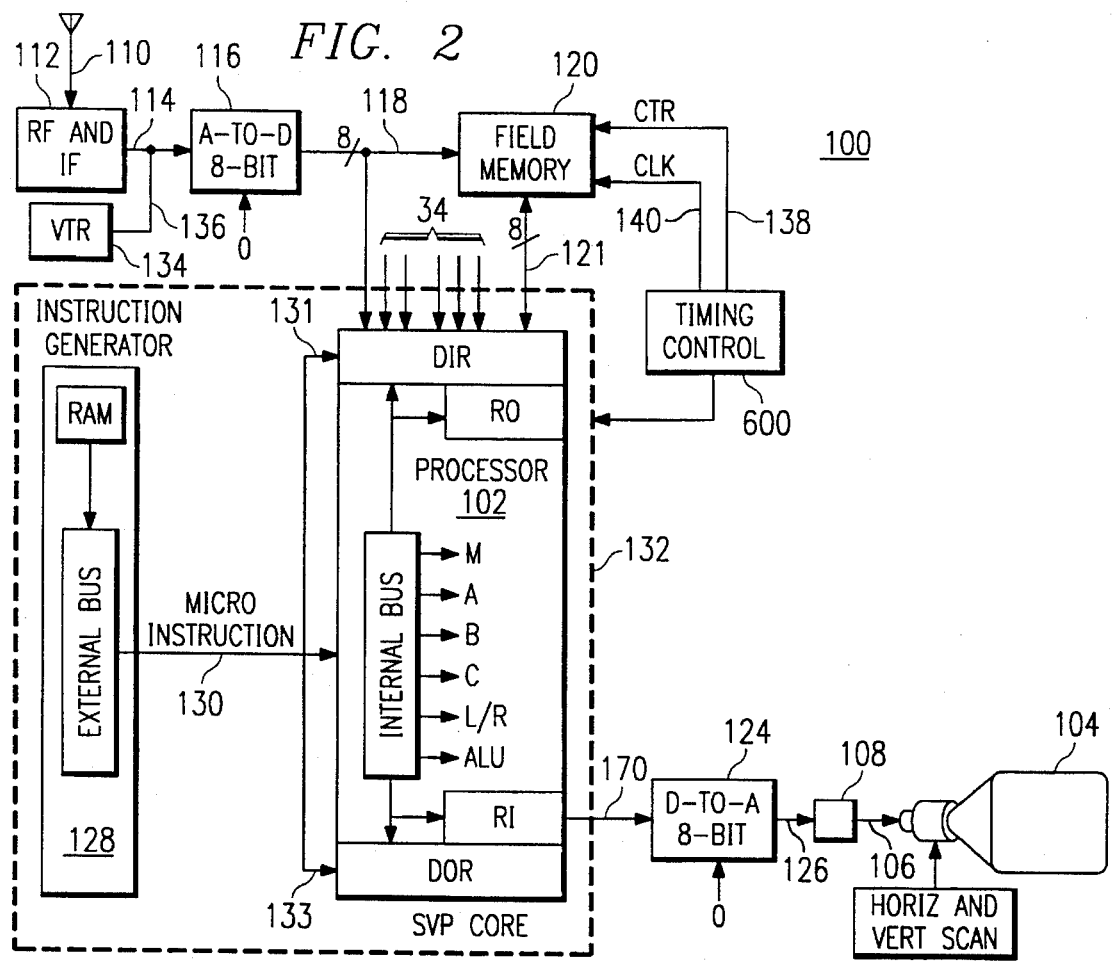
FIG. 2 illustrates a video system using a scan-line video processor.

Referring now to FIG. 2, there is illustrated a general TV or video system 100 implemented with a synchronous vector processor device 102. System 100 comprises a CRT 104 of the raster-scan type receiving an analog video signal at input 106 from standard analog video circuits 108 as used in a conventional TV receiver. A video signal from an antenna 110, is amplified, filtered and heterodyned in the usual manner through RF and IF stages 112 including tuner, IF strip and sync separator circuitry therein, producing an analog composite or component video signal at line 114. Detection of a frequency modulated (FM) audio component is separately performed and not further discussed here. The horizontal sync, vertical sync, and color burst are used by timing controller 600 to provide timing to the SVP 102 and thus are not part of SVP's data path. The analog video signal on line 114 is converted to digital by analog-to-digital converter 116. The digitized video signal is provided at line 118 for input to the synchronous vector processor 102.

The processor 102 processes the digital video signal present on line 118 and provides a processed digital signal on lines 170. The processed video signal is then converted to analog by a digital-to-analog converter 124 before being provided via line 126 to standard analog video circuits 108. Video signals can be provided to analog-to-digital converter 116 from a recorded or other non standard signal source such as video tape recorder 134. The VTR signal is provided on line 136 and bypasses tuner 112. Processor 102 can input one (or more) video frames in a field memory 120, which is illustratively a Texas Instruments Model TMS4C1060 field memory device. Field memory 120 receives control and clocking on lines 138 and 140 from timing controller 600. The video signal input on line 114 is converted to 8-bit digitized video data by analog-to-digital converter 116 at a sampling rate of, for example, 14.32 MHz (a multiple X4 of the color subcarrier frequency, 3.58 MHz). There are a total of 40 input lines to SVP 102. As stated, eight are used for the digitized video signal. Others are used as inputs for frame memory output, alternate TV source, etc. Digital-to-analog converter 124 can also reconstruct at the rate of 14.32 MHz to convert an 8-bit processor output to analog. The remaining output lines may be used for other signals. Alternatively, analog-to-digital and digital-to-analog converters 116 and 124 can operate at different sample rates as desired for a particular purpose.

Processor 102 is supplied by an instruction generator 128. Instruction generator 128 applies twenty-four microcode control bits and fourteen address bits on lines 130 to processor 102. For relatively low speeds, instruction generator 128 is suitably a standard microprocessor or microcontroller device such as commercially available Texas Instruments Model TMS 370C050, for example. For faster speeds, a higher speed controller stores software code in RAM or ROM, or a state machine or sequencer is employed. The instruction generator 128 is suitably located on the same semiconductor chip as the processor 102 to form a unit 132, of FIG. 2, especially if it essentially comprises stored code in a ROM with an associated address counter. The Microinstructions can control the operation of seven fundamental (or "primitive") gating and ALU functions within a single cycle. All of the PEs are controlled by the same instruction; thus the architectural designation Single Instruction Multiple Data (SIMD).

Figure 3:
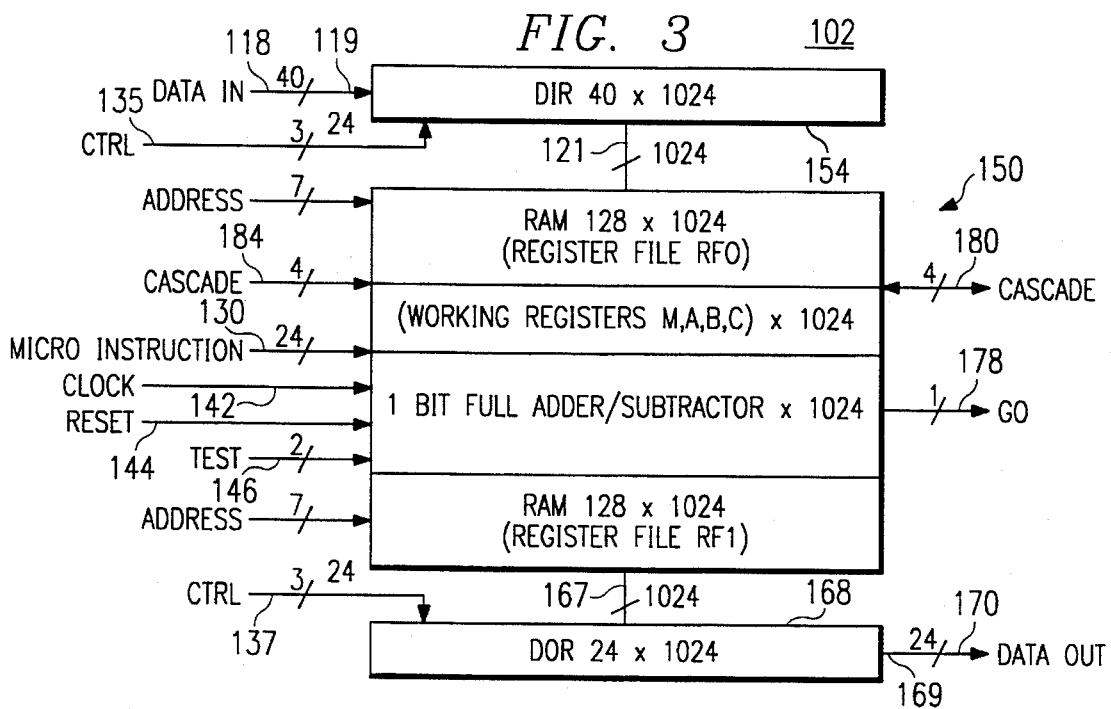
FIG. 3 illustrates the synchronous vector processor as used in the FIG. 1 system in greater detail.
Figure 4:
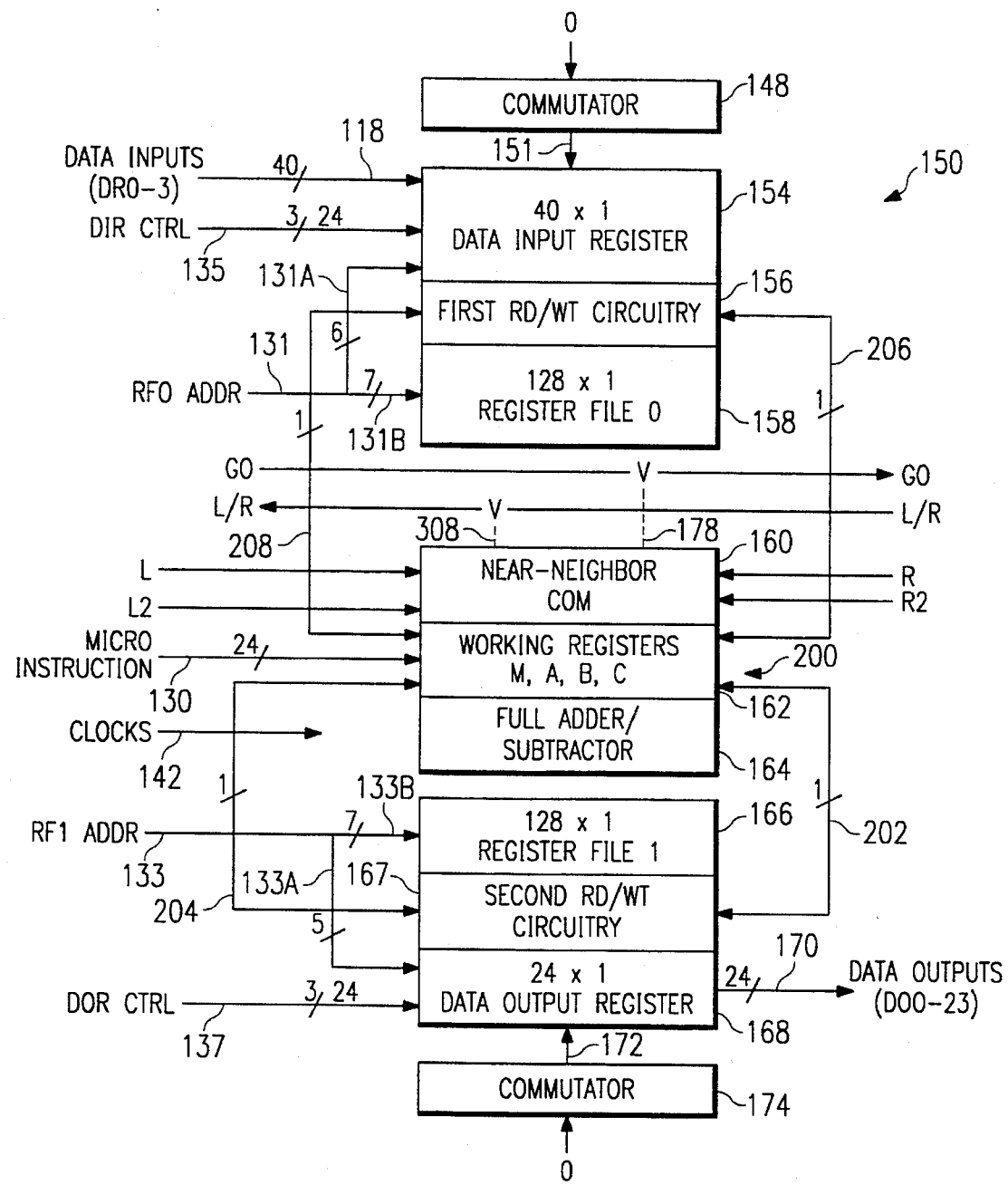
FIG. 4 illustrates one processor element of the FIG. 2 synchronous vector processor.

Referring now to both FIG. 3 and FIG. 4, there is illustrated a preferred embodiment of the SVP device 102 which includes a one-dimensional array having 1024 1-bit processing elements (PE) 150. An individual processor element 150 is depicted in FIG. 4. Each processor element 150 comprises a forty-bit data input register (DIR) 154, organized as 40×1; a first 128-bit register file (RF0) 158, organized as 128×1; working registers A,B,C and M 162; an arithmetic logic unit 164 including a 1-bit full adder/subtractor; a second 128-bit register file (RF1) 166, organized as 128×1; and a 24-bit data output register (DOR) 168, organized as 24×1. Processor 102, as depicted in FIG. 4, further comprises first read/write circuitry 156 to control reading and writing of dam between the DIR/RF0 registers 154/158 working registers A,B,C and M 162, and arithmetic logic unit 164. Second read/write circuitry 167 is provided to control reading and writing of dam between DOR 168/RF1 166 registers, working registers A,B,C and M 162, and arithmetic logic unit 164.

Data flow within the PEs is pipeline in three layers or pipeline steps, Input, Computation and Output. In the input layer, the Data Input Register (DIR) acquires or accumulates a packet of data word-serially. In the computation layer the programmed operations are performed simultaneously on all the elements of an already acquired packet via a processor-per-word operation. The output layer transfers yet another packet from the Data Output Register (DOR) to the output pins, again word-serially. Within each phase of the computation layer pipeline, a multiplicity of cycles/instructions perform the required operations. The input and output layers or pipeline steps accumulate one data word per cycle, but minimize the I/O pin requirements by using multiple cycles to transfer the entire packet of data. The number of data words per packet is hardware or software established for each application or system subject to the size of the processor element array; 1024 in the preferred embodiment.

The computation layer or pipeline step also uses multiple cycles to operate on the data. The ALU and data paths dedicated to each data word are one bit wide. Thus, functions on multibit words can be computed in multiple cycles.

DIR 154 loads the digitized video signal from lines 118, when an enable signal is applied at input 151. This enable signal is supplied by a 1-of-1024 commutator, sequencer or ring counter 148. Commutator 148 is triggered to begin at the end of a horizontal blanking period, when a standard video signal is present on lines 118, and continue for up to 1024 cycles (at 14.32 MHz) synchronized with the sampling rate (frequency) of analog-to-digital converter 116. Similarly, DOR 168 provides the processed video signal on lines 170 when an enable signal is applied at input 172. This enable signal is received from another 1-of-1024 commutator, sequencer or ring counter 174. Commutator 174 is triggered to begin at the end of a horizontal blanking period and continue for up to 1024 cycles synchronized with the sampling rate of digital-to-analog converter 124.

Each PE has direct communication with its four nearest neighbors (two to the left and two to the right). Each of the two RFs is capable of independent addressing and read-modify-write cycles such that two different RF locations can be read, the data operated upon by Arithmetic Logic Unit (ALU) 164, and the result written back into one or both of the register files RF0 or RF1 locations in a single clock cycle.

External lines are connected in common to all of the processor elements, PEs 150, in the processor array of FIG. 4. They include forty data input lines 118, 7 DIR/RF0 address lines 131, 24 control lines 130, clock and reset signal lines 142 and 144, 2 test lines 146, 7 DOR/RF1 address lines 133, 24 data output lines 170 and a 1-bit global output 178 (GO) line.

The I/O system of the SVP 102 comprises the Data Input Register 154 (DIR) and the Data Output Register 168 (DOR). DIR 154 and DOR 168 are sequentially addressed dual-ported memories and operate as high speed shift registers. Both DIR and DOR are dynamic memories in the preferred embodiment.

Figure 5:
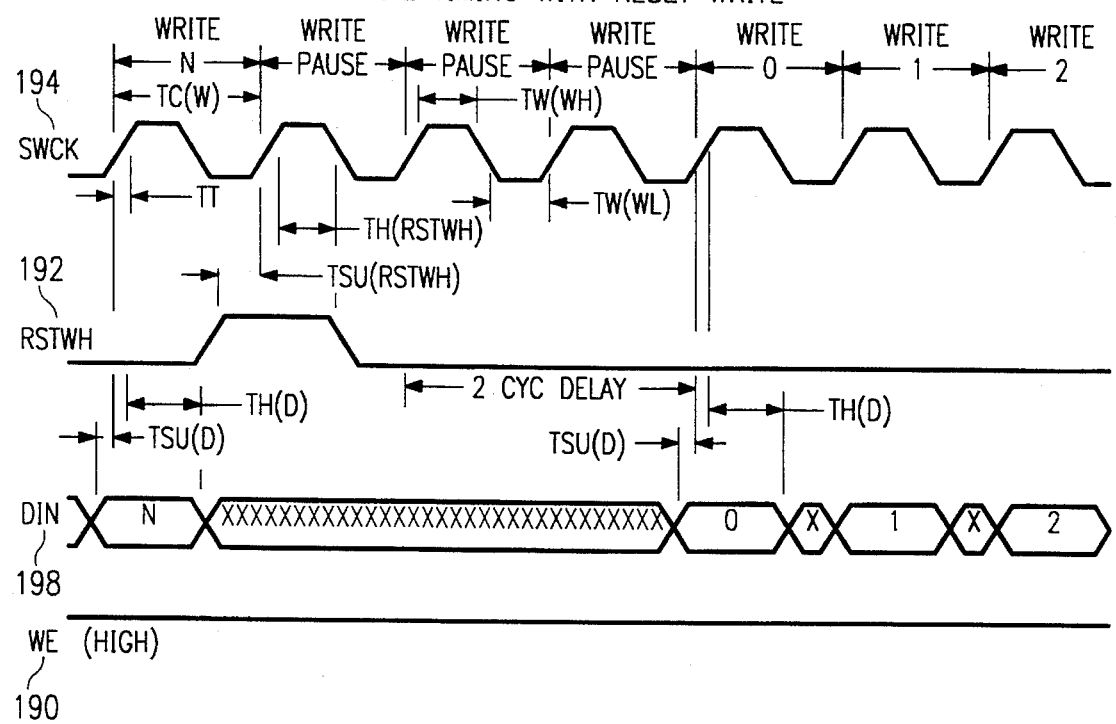
FIG. 5 illustrates a timing diagram for a Data Input Register write.
Figure 6:
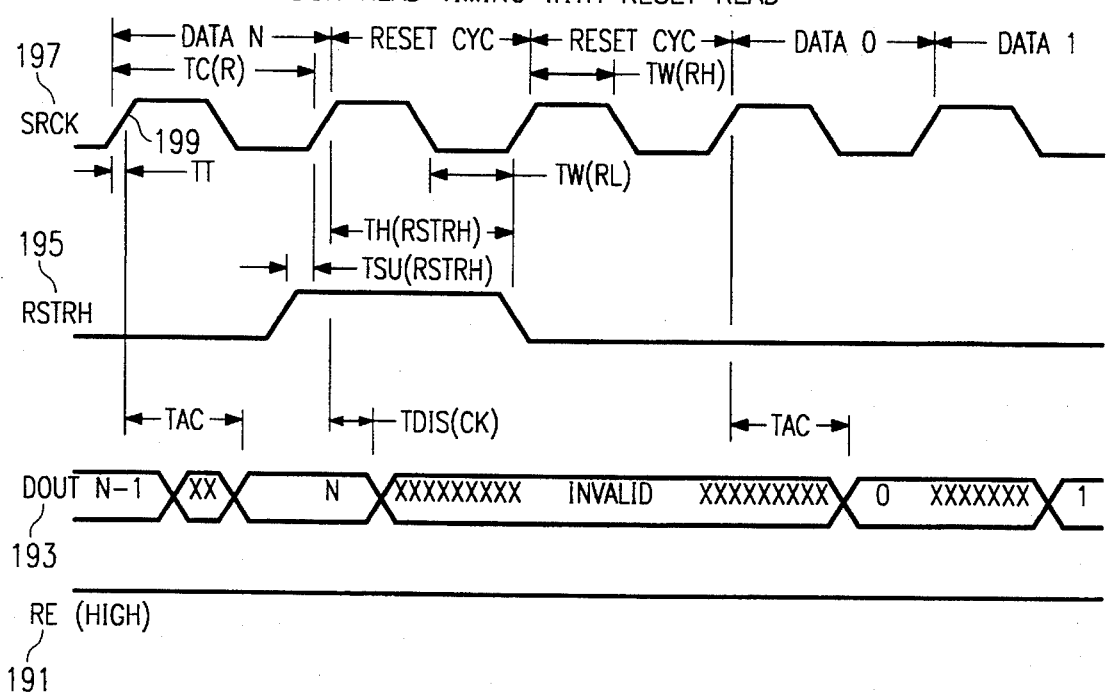
FIG. 6 illustrates a timing diagram for a Data Output Register read.

With reference again to FIG. 3, the DIR of processor 102 is a 40960 bit dynamic dual-ported memory. One port 119 is organized as 1024 words of 40 bits each and functionally emulates the write port of a 1024 word line memory. FIG. 5 depicts a timing diagram for a DIR write. The 40 Data Inputs 118 (DI0 through DI39) are used in conjunction with timing signals Write Enable 190 (WE), Reset Write 192 (RSTWH), and Write Clock 194 (SWCK). WE 190 controls both the write function and the address pointer 148 (commutator) increment function synchronously with SWCK 194. When high, the RSTWH 192 line resets the address pointer 148 to the first word in the 1024 word buffer on the next rising edge of SWCK. SWCK 194 is a continuous clock input. After an initial three clock delay, one 40 bit word of data 198 is written on each subsequent rising edge of SWCK 194. If data words 0 to N are to be written, WE remains high for N+1 rising edges of SWCK. The address pointer 148 may generally comprise a 1-of-1024 commutator, sequencer or ring counter triggered to begin at the end of a horizontal blanking period and continue for up to 1024 cycles synchronized with the sampling frequency of the A-to-D converter 116. The input commutator 148 can be clocked at above 1024 times the horizontal scan rate. The output commutator 174 can be, but not necessarily, clocked at the same rate as the input.

It should be noted at this time that although, for purposes of discussion, processor 102 is depicted as having 1024 processor elements, it can have more or less. The actual number is related to the television signal transmission standard employed, namely NTSC, PAL or SECAM, or the desired system or functions in non television applications.

The second port 12 1 of data input register 154 is organized as 40 words of 1024 bits each; each bit corresponding to a processor element 150. Port 121 is physically a part of, and is mapped into the absolute address space of RF0; therefore, the DIR and RF0 are mutually exclusive circuits. When one is addressed by an operand on a given Assembly language line of assembler code, the other cannot be. An Assembly language line which contains references to both will generate an error at assembly-time.

With reference again to FIG. 4, DOR 168 is a 24576 bit dynamic dual-ported memory. One port 169 is organized as 1024 words of 24 bits each and functionally emulates the read port of a 1024 word line memory. The Data Outputs (DO0 through DO23) 170 are used in conjunction with the signals Read Enable (RE), Reset Read (RSTRH), and serial Read Clock (SRCK). SRCK 197 is a continuous clock input. RE 191 enables and disables both the read function and the address pointer increment function synchronously with SRCK 197. When high, the RSTRH line 195 resets the address pointer (commutator) to the first word in the 1024 word buffer on the next rising edge of SRCK 197. After an initial two clock delay, one 24 bit word of data is output an access time after each subsequent rising edge of SRCK. If data words 0 to N are to be read, then RE must remain high for N+1 rising edges of SRCK. As discussed hereinabove with reference to DIR 154, the address pointer 174 can similarly comprise a 1-of-1024 commutator or ring counter.

The second port of data output register 168 is organized as 24 words of 1024 bits each; each bit corresponding to a Processor Element 150. Port 167 of DOR 168 is physically a part of, and is mapped into the absolute address space of RF1 166; therefore, the DOR 168 and RF1 166 are mutually exclusive circuits. When one is addressed by an operand on a given Assembly line, the other cannot be. An Assembly line which contains references to both will generate an assembly-time error. DOR 168 works independently of DIR 154; therefore it has its own address lines 133 and some of its own control lines 137. Further, they operate asynchronously in the preferred embodiment. RF0 158 works independently of RF1 166; therefore it has its own address lines 131 and some of its own control lines, and RF1 166 works independently of RF0 158; therefore it has its own address lines 133 and some of its own control lines.

With further reference to FIG. 4, the Read/Write circuitry 156 and the Read/Write circuitry 167 include one or more sense amps. The RF0 basically comprises a 128-bit dynamic random access memory configured 1×128. In practice, the RF0 dam memory 158 and the DIR input register 154 are both parts of the 1×168 DRAM column, but the DIR 154 differs from the RF0 158 in that the DIR 154 can be written into from the inputs, which comprise forty parallel bits. Data is sensed and then transferred between the registers and multiplexers 200 and the memory banks DIR/RF0 and DOR/RF1 via I/O lines 202, 204, 206 and 208. The particular bit being addressed in the RF0 158 is selected by internal word lines. The instruction generator 128 provides six address bits 131A to DIR 154 for a 1-of-64 address selection; the seventh bit is decoded as "=0" for DIR selection, "1" for DIR deselected and provides seven address bits 131B to RF0 158 for a 1-of-128 address selection. The same address selection is provided to RF0 or DIR of all 1024 processor elements 150. Likewise, a second 1-bit wide dynamic RAM 166, referred to as RF1, again receiving seven address bits 133B for a 1-of-128 address selection. The RF1 166 memory is associated with a 24-bit dam output register 168 called DOR, receiving five address bits 133A for 1-of-32 address selection. The input commutator 148 can be clocked at above 1024 times the horizontal scan rate, so all 1024 of the input registers 154 can be loaded during a horizontal scan period.

The pointer input 151 from the commutator 148 is operable to gate 40 internal data lines (not shown) to internal dual port dynamic memory cells. Reading and writing can be performed for each port on the memory cells with DIR operating as a dynamic shift register. The dual port nature allows synchronous communication of data into and out of the DIR. By utilizing dynamic cells, the shift register layout is greatly reduced.

DIR 154 also operates as a high speed dynamic shift register. The control address lines 135 receive many lines, certain ones being a C21, C8, C2, C1 and C0 and the contents of the M-working register in the block 200. Additionally, the addresses RF0A6 through RF0A0 input on address lines 131 to the RF0 register 158 also provide control. The control line C2=1 selects the DIR 154. The seven address lines RF0A6–RF0A0 select 1-of-40 bits to be read or written to while C1 and C0 select the Write source (for a Read C0 and C1 it does not matter). With certain combinations of lines C1 and C0, the Write source for DIR 154 depends on the state of C21 and C8 and the contents of working register M. These form instructions called M-dependent instructions which allow more processor 102 flexibility. Table 1 sets forth the control line function for DIR 154.

TABLE 1

| C21 | C8 | C2 | C1 | C0 | (WRM) | Operation on DIR |
|-----|----|----|----|----|-------|------------------|
| X | X | 0 | X | X | X | RF0 selected |
| X | X | 1 | 0 | 0 | X | DIR (m) written into DIR(m) (refresh) |
| X | X | 1 | 1 | 0 | X | SM written into DIR(m) |
| X | X | 1 | 1 | 1 | X | (WRM) written into DIR(m) |
| 0 | X | 1 | 0 | 1 | X | (WRC) written into DIR(m) |
| 1 | 0 | 1 | 0 | 1 | 0 | (L/R line of right PE to DIR(m) |
| 1 | 0 | 1 | 0 | 1 | 1 | (L/R line of left PE to DIR(m) |
| 1 | 1 | 1 | 0 | 1 | 0 | (L/R line of 2nd right PE to DIR(m) |
| 1 | 1 | 1 | 0 | 1 | 1 | (L/R line of 2nd left PE to DIR(m) |

Similar to the DIR 154, the exact function of the DOR 168 is driven by control lines 137, the control lines being C21, C5, C4, C3 and the contents of the working register M and also by addresses RF1A6–RF1A0. Control line C5=1 selects the DOR 168. The seven address lines 133 select 1-of-24 bits to be read or written to while C4 and C3 select the Write source. With certain combinations of control lines C4 and C3, the Write source DOR 168 depends on the state of C21 and the state of working register M. These form instructions called M-dependent instructions which allow more processor 102 flexibility. Table 2 sets forth the control line functions for DOR 168.

TABLE 2

| C21 | C5 | C4 | C3 | (WRM) | Operation on DOR |
|-----|----|----|----|-------|------------------|
| X | 0 | X | X | X | RF1 selected |
| X | 1 | 0 | 0 | X | DOR(q) written into DOR(q) (refresh) |
| X | 1 | 0 | 1 | X | (WRC) written into DOR(q) |
| X | 1 | 1 | 0 | X | SM written into DOR(q) |
| 0 | 1 | 1 | 1 | X | CY written into DOR(q) KCY-Conditional Carry: |
| 1 | 1 | 1 | 1 | 0 | DOR(q) written into DOR(q) |
| 1 | 1 | 1 | 1 | 1 | CY written into DOR(q) |

For a synchronous operation, data is first input to the DIR 154 and then processed with the PE followed by output from the DOR, These are "concurrent" operations in 1H and are synchronized. The data transferred from DIR-to-PE and from PE-to-DOR are required in the same period such as during the horizontal blanking. Otherwise, current and 1H prior data would be read by the PE and, furthermore, Write-Read contention would occur between Write-by-DIR and Read-by-PE against the same DIR memory cell. The same problem will exist between the PE and the DOR 168.

Figure 7:
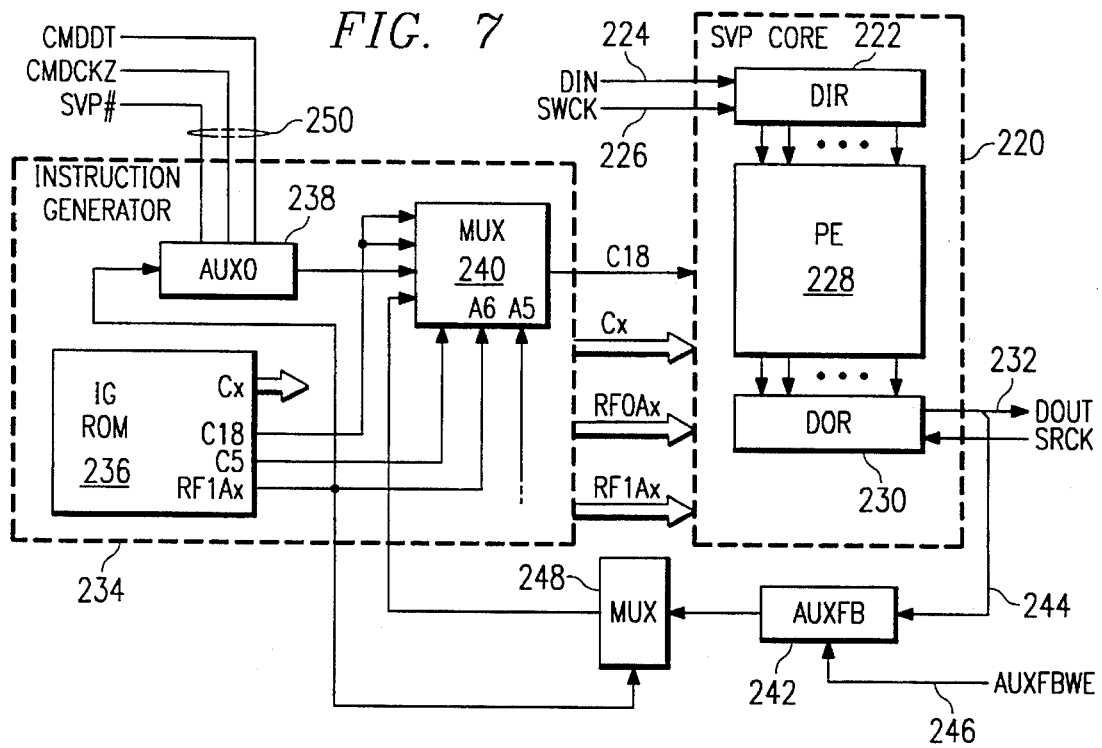
FIG. 7 illustrates a block diagram of the SVP core and Instruction Generator utilizing the auxiliary register in a feedback configuration o globally distribute a previously calculated variable to the core.

Referring now to FIG. 7, there is illustrated an overall block diagram view of the SVP of the present invention utilizing the auxiliary feedback register. An SVP core 220 is provided, having a DIR 222 which receives on the input thereof a word serial data input on input lines 224, this being a 40-bit input. The DIR 222 also receives a Write clock signal SWCK on a line 226. DIR 222 is operable to output the data therefrom in a parallel manner to a parallel processing element (PE) 228, which is operable to process the data received from the DIR 222 in accordance with a predetermined processing algorithm and output the data to a DOR 230. The DOR 230 then provides a 24-bit output on output lines 232.

The PE 228 is controlled by an Instruction Generator (IG) 234 which is operable to output control signals $C_x$, and addresses for Register File RF0 and Register File RF1 in the form of addresses RF0Ax and RF1Ax. The IG 234 has associated therewith an IG ROM 236 which is operable to output the various control signals $C_x$ and the addresses for the register files. Additionally, the IG 234 has associated therewith an auxiliary register 238 (AUX), which is operable to store data for use in the processing algorithm by the PE 228. A multiplexer 240 is provided for receiving the output of the AUX register 238 and also for receiving the C18 output control value from the IG ROM 236. The multiplexer 240 is controlled by signals from the IG ROM 236 to determine what value is output as the C18 value to the PE 228, the C18 being a working value utilized by the PE 228 as a variable during processing of data by the PE 228. This variable is globally distributed to all of the processing elements in the PE 228.

The output of the DOR 230 is also input to an auxiliary register AUXFB (AUX register with feedback) 242 through lines 244 to store a previously calculated value for use in a subsequent calculation by the PE 228, as will be described hereinbelow. The AUXFB register 242 is enabled by a signal AUXFBWE on a line 246. The output of the AUXFB register 242 is input to a multiplexer 248, which is a 24-to-1 multiplexer that outputs one of the register outputs in the AUXFB register 242 to an input to the multiplexer 240, this input then being selectable by the IG ROM 236. The RF1Ax output of the IG ROM 236 is utilized to control the selection operation in the multiplexer 248 and also control the operation of AUX register 238. The data input to the AUX register 238 is received on input lines 250.

As will be described in more detail hereinbelow, the SVP core 220 is operable to perform a number of calculations during the horizontal synchronization period of the data received on the data input lines 224. Calculated results by PE 228 are transferred in parallel to DOR 230 and serially output on the signal line 232. One of the DOR outputs is stored in AUXFB 242 by AUXFBWE 246. This information is utilized on a subsequent calculation by the PE 228 by selecting the output of the AUXFB register 242 with the multiplexer 240 and the multiplexer 248. The multiplexer 248 selects one of the multiple data values in the AUXFB register 242, whereas the multiplexer 240 selects the output of the multiplexer 248 for input to the PE 228 to utilize this value as a global variable during processing. As will also be described hereinbelow, the data utilized to generate the value stored in AUXFB register 242 is also used in a subsequent cycle of the PE 228 to provide other calculations, and during these other calculations, the value stored in the AUXFB register is utilized as the global variable.

Figure 8:
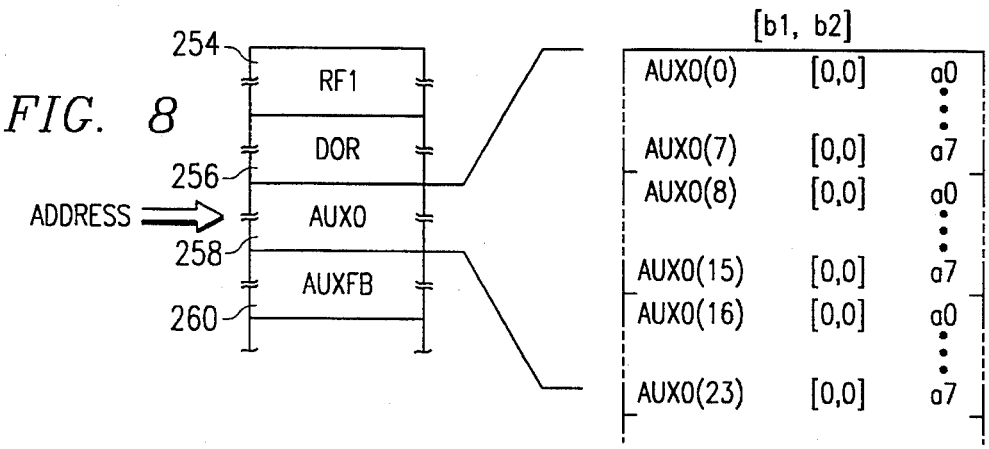
FIG. 8 illustrates a memory map of the auxiliary register.

Referring now to FIG. 8, there is illustrated a memory map of the AUXFB register 242 and the AUX register 238. In this configuration, the AUXFB register 242 is located in the address space above the AUX register 238. Address lines for the RF1 register are utilized to read individual AUX and AUXFB register bits. The RF1 address space is represented by a block 254, the DOR address space is represented by a block 256, the AUX register 238 address space is represented by a block 258 and the AUXFB register 242 address space is represented by a block 260. The RF1 address space 254 provides 128 addressable locations extending from the address location "00000000" and extending to "01111111". The DOR address space 256 is operable to provide twenty-four address locations from address "10000000" extending to "10010111". The AUX address space 258 is operable to provide thirty-two address locations extending from "11000000" and extending to "11011111". The AUXFB address space 260 is operable to provide twenty-four addressable locations extending from address "111000000" and extending to "11110111". When the control code from the IG ROM 236 points to the auxiliary register area, the C18 variable replaced by the contents of either the AUX register or the AUXFB register to distribute the variable globally to the SVP core 220.

Figure 9:
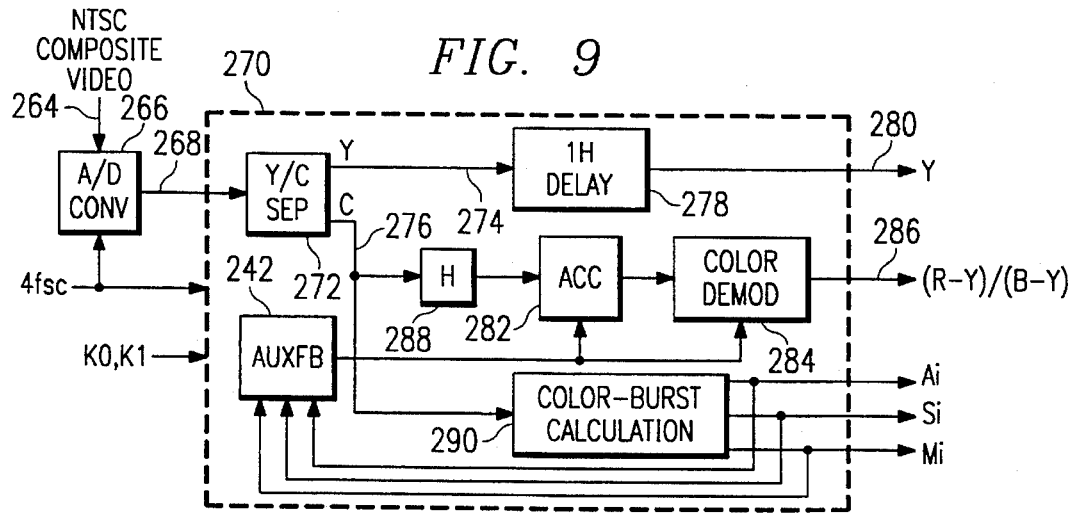
FIG. 9 illustrates a block diagram of one application of the SVP utilizing the auxiliary feedback register.

Referring now to FIG. 9, there is illustrated one application of the present invention which is utilized for Automatic Color Control (ACC) and color demodulation in a digital TV application. This system is generally described in Masafumi Yugami, Kazuhiro Ohara and Akira Takeda, "EDTV with Scan-Line Video Processor", *IEEE Transactions on Consumer Electronics*, Vol. 38, No. 3, August 1992, pgs. 553–562, which reference is incorporated herein by reference. An NTSC composite video signal is input on a line 264 to an analog-to-digital converter 266 to provide an 8-bit digitized video signal on an input line 268, this then input to an SVP 270. The A/D converter 266 and the SVP 270 operate on a clock frequency of four times the color subcarrier frequency or $4f_{sc}$. The input line 268 is input to a Y/C separator 272 to provide a luminescent signal Y and the chroma signal C on output lines 274 and 276, respectively. The Y-signal is input to a delay block 278 to delay the output by one horizontal scan line and output the delayed Y-value on a line 280. The C-signal on line 276 is processed in two modes. In a delayed mode, the ACC calculation is provided by a block 282 and then the color demodulation operation provided by a Color Demod block 284. This provides on the output the demodulated color signal (R-Y)/(B-Y) on a line 286. A one scan line delay is provided on the input to the input to the ACC block 282 by a delay block 288, as will be described hereinbelow.

In the other mode of calculation, a non-delayed mode, the C-signal on line 276 is input to a color burst calculation block 290 that represents the processing operation of the PE 228 wherein the amplitude $A_i$ of the color burst signal and the phase relationship values $S_i$ and $M_i$ of the color burst signal are generated. These values are input to the AUXFB register 242, the outputs are then utilized by the ACC block 282 and the Color Demod block 284 during the calculations performed thereby. It can be seen that the delay by the calculation in the colorburst calculation block 290 and the signal path through the AUXFB register 242 is compensated by the delay block 288. Therefore, the data calculated and transferred by the color-burst calculation block 290 and AUXFB register 242 are utilized in the ACC 282 and the color-demodulation block 284 for the same C-signal input on the signal line 276. This will be described in more detail hereinbelow. Additionally, constants K0 and K1 are utilized by the Color Demod calculation block 284, as will be described hereinbelow.

Figure 9A:
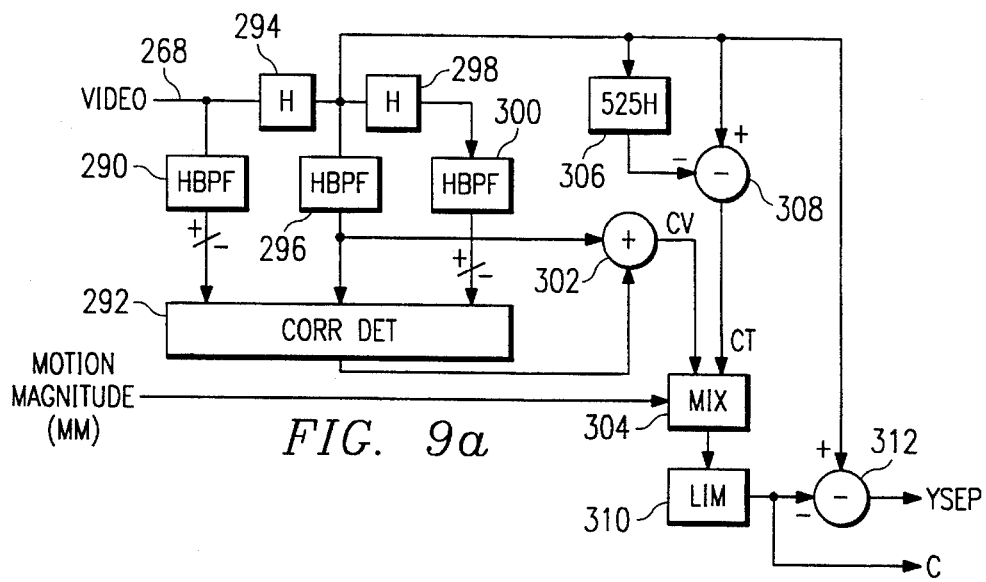
FIG. 9a illustrates a block diagram of the Y/C separator circuit.

Referring now to FIG. 9a there is illustrated a block diagram of the Y/C separator block 272 of FIG. 9. The Y/C separator block 272 is operable to perform an inter-frame processing with a two-tap temporary filter for the stationary image area, and it also performs intra-field processing with a three-line adaptive comb filter and 5-tap horizontal bandpass filter. The three-line adaptive comb filter utilizes line correlation of the chroma signal, and provides a two-line vertical comb filter between the current line and either the upper or lower line based on the correlation. An extracted chroma component by inter-frame processing (CT) and another extracted chroma component by intra-field processing (CV) are mixed pixel-wise in proportion to the motion magnitude (MM) in accordance with the following expression:

$$C=MM*CV+(1-MM)*CP \qquad (1)$$

where, MM must be between 0 and 1 inclusive. The CV signal is generated by passing the video directly through a bandpass duplicated with FIG. 9 color-burst calculation block 293 and a sign inverter to a correlation detector 292, through a delay block 294 and a bandpass filter 296 to the detector 292, and through a second delay block 298, a bandpass filter 300 and a sign inverter to the detector 292. The detector 292 tests the correlation of the three inputs and outputs one of them.

The output of the detector 292 is input to one input of the summing device 302, which is summed with the output of the bandpass filter 296. This provides the CV signal on the output thereof which is input to a mixer 304, which is controlled by the motion magnitude signal (MM) from the motion detector 16 in FIG. 1. The output of a delay block 294 is input to a delay circuit 306 to provide a delay of 525 horizontal lines. The delayed output of circuit 306 and the output of the delay block 294 are input to a subtraction circuit 308. This provides the CT signal for input to the mixer 304, which is then limited by a limiting block 310 to avoid an overflow and an underflow. This provides the chroma signal C. The chroma signal C is subtracted from the output of the delay block 294 with a subtraction circuit 312 to provide the $Y_{sep}$ signal. Although not illustrated, the $Y_{sep}$ signal is then input to a Vertical Contour Compensator. This incorporates a three-line vertical bandpass filter which first extracts the component around 525/4 cph in the separated luminescent signal ($Y_{sep}$) and then a Horizontal Bandpass Filter (HBPF) rejects the component around $f_{sc}$ to obtain a vertical contour value. Once the contour value is extracted, its amplitude is controlled by a global variable through the AUX register from the external source, and then back to the delayed Y-signal. The output is then limited to avoid an overflow and an underflow.

Figure 10:
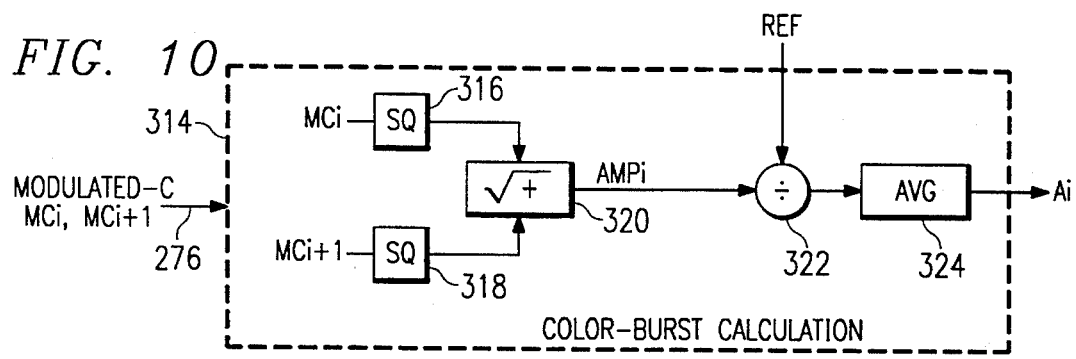
FIG. 10 illustrates a block diagram representation of the color burst calculation.

Referring now to FIG. 10, there is illustrated a block diagram representation of one portion of the color burst calculation for generating the amplitude $A_i$. The modulated C signal $MC_i$, $MC_{i+1}$... is input to a block 314 representing this calculation. The $MC_i$ value is squared in a block 316 and the subsequent value $MC_{i+1}$ is squared in a block 318, these two values then summed and the square root taken by a block 320. This provides the burst amplitude. An input constant (REF) is then utilized to normalize the burst amplitude by dividing the constant REF by the first amplitude $AMP_i$ in a divide circuit 322. This provides the following relationship:

$$A_i = \frac{REF}{\sqrt{MC_i^2 + MC_{i+1}^2}} \quad (2)$$

The normalized first amplitude is then input to an averaging block 324 to provide the mean value of the first amplitude over a number of samples, for example, eight samples. However, the mean value can be taken before calculation of the first amplitude by averaging the input samples of the modulated C-signal over the sum of adjacent samples. As will be described hereinbelow, only the central processor element (PE) in the color-burst portion has the correct mean value, $A_N$, and the Write Enable signal (AUXFBWE) for the AUXFB register 242 will only become active when this correct value is output from the DOR 230.

Figure 11:
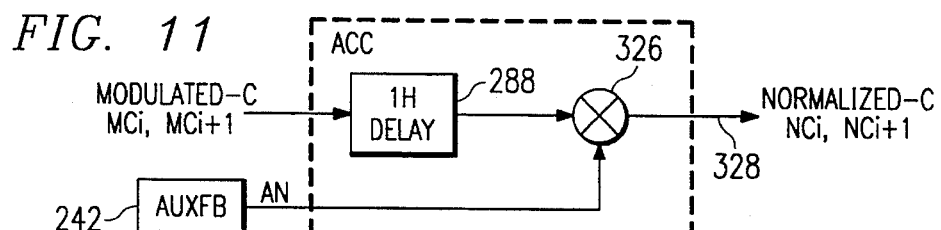
FIG. 11 illustrates a block diagram representation of the automatic color control calculation.

Referring now to FIG. 11, there is illustrated a block diagram representation of the calculations required to implement the ACC function. The modulated C-signal is input to a 1-H delay block 288 to provide a delay of one horizontal scan line. This is then output to a multiplication block 326 to multiply the delayed modulated C-signal value $MC_i$ with the value $A_N$ in the AUXFB register 242. This provides on an output 328 a normalized C-signal $NC_i$, $NC_{i+1}$..., which is then input to the Color Demod block 284. Note that the multiplication operation provided by the multiplication block 326 is performed on the entire horizontal line data in the SVP core 220.

Figure 12:
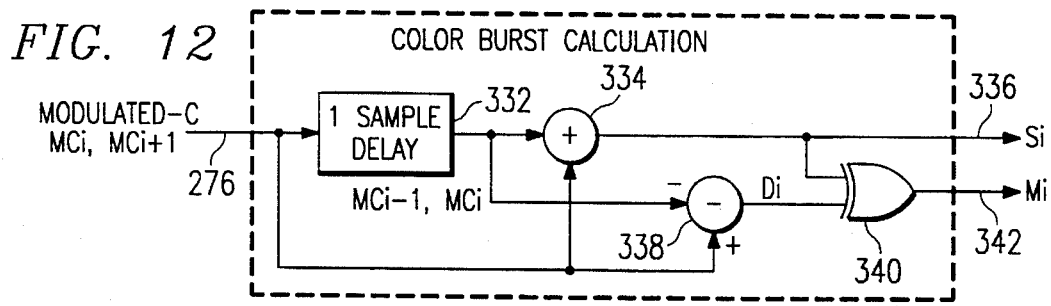
FIG. 12 illustrates a block diagram representation of the color burst calculation associated with the burst amplitude and phase components.

Referring now to FIG. 12, there is illustrated the portion of the color burst calculation block 290 wherein the color burst phase components $S_i$ and $M_i$ are determined. In order to demodulate the color signal by the SVP 220, it is necessary to have the color burst phase information. When a $4f_{sc}$ burst-clocked oscillator is utilized to drive the overall system, and its $4f_{sc}$ clock output is in phase with the (R-Y)/(B-Y) axis, the sampling points at the color burst signal will represent +(B-Y), +(R-Y), -(B-Y) or -(R-Y), as illustrated in the timing diagram of FIG. 13.

Figure 13:
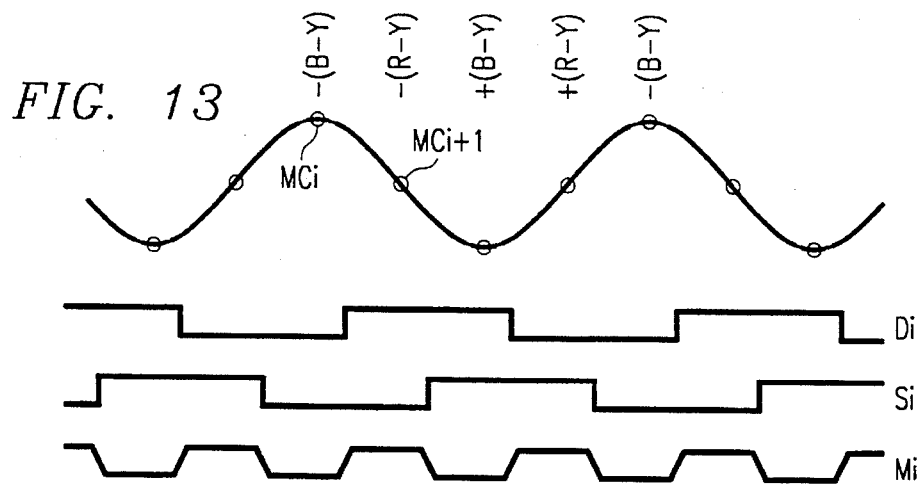
FIG. 13 illustrates timing diagrams associated with the block diagram representation of FIG. 12.

In the color burst calculation block of FIG. 12, the modulated C-signal on line 276 is input to a one sample delay block 332 and the output thereof input to a summing block 334. The summing block 334 sums the output of the delay block 332 with the undelayed signal on line 276 to provide the $S_i$ signal on an output line 336. Similarly, the output of the delay block 332 is subtracted from the signal on line 276 with a subtraction block 338 to provide an output $D_i$, which is input to one input of an exclusive OR (EXOR) gate 340, the other input thereof connected to the $S_i$ signal on line 336. The output on the EXOR gate 340 is output on a line 342 as the $M_i$ signal. The timing diagram for the signals associated with the calculations of FIG. 12 are illustrated in FIG. 13, with the $D_i$ signal representing the sign bit of the difference between $MC_i$ and $MC_{i-1}$ and the $S_i$ signal representing the sign bit of the operation of the sum of $MC_i$ and $MC_{i-1}$. Although not illustrated, the mean value of the modulated C-signal is typically taken before the color burst calculation in order to remove noise. This mean value is taken over a position less than the overall burst period. Additionally, only the center processor in the PE 228 during the burst period will have a correct mean value, $S_N$ and $M_N$. The correct mean value, $S_N$ and $M_N$, is stored into the AUXFB 242 by transferring all of the $S_N$ and $M_N$, into DOR 230, and then latch only the correct value, $S_N$ and $M_N$, into AUXFB 242 by AUXFBWE.

Figure 14:
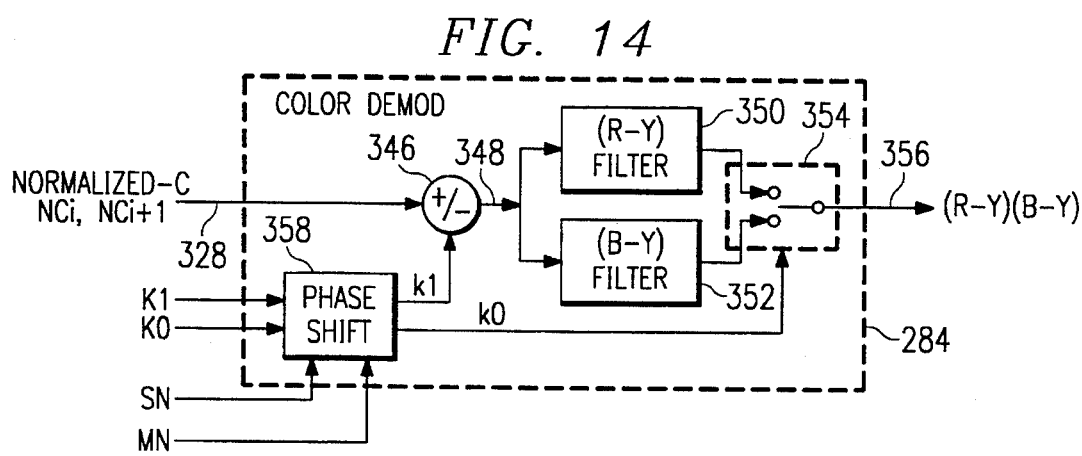
FIG. 14 illustrates a block diagram representation of the color demodulation algorithm.

Referring now to FIG. 14, there is illustrated a block diagram representation for the calculation involved with the color demodulation processor by the SVP 220. In the Color Demod block 284, the normalized C-input signal on line 328 from the ACC block 282 is essentially demodulated by a conditional complement circuit 346 which receives as a second input the value k1. Whenever k1 is equal to zero, the value input to the conditional complement block 346 is output therefrom. Whenever the input k1 is equal to one, the complement of the input to the block 346 is output therefor. This provides on the output thereof the CR-Y)/(B-Y) multiplexed signal on a line 348. The line 348 is input to an (R-Y) filter 350 and also to a (B-Y) filter 352. The output of the filter 350 is output to one input of a two input/one output switch 354, the other input thereof connected to the filter 352. The switch 354 is controlled by the k0 signal. The switch 354 selects the filter 350 when k0 is equal to one, and the output of filter 352 when k0 is equal to zero. The filtered (R-Y)/(B-Y) multiplexed signal is then output on a line 356 from the switch 354.

The block 284 receives the constants K1 and K0 utilized by the color demodulation operation and which are introduced from the DIR and stored in the PE. A phase shift circuit 358 is provided which is operable to phase shift the values K1 and K0 to output the values k1 and k0, respectively. The logic of the phase shift block 350 is as follows:

k0=K0 EXOR $M_N$ k1=K1 EXNOR{(K0 EXOR $S_N$)NAND Mn}NAND{(NOT $M_N$)NAND $S_N$}

Figure 15:
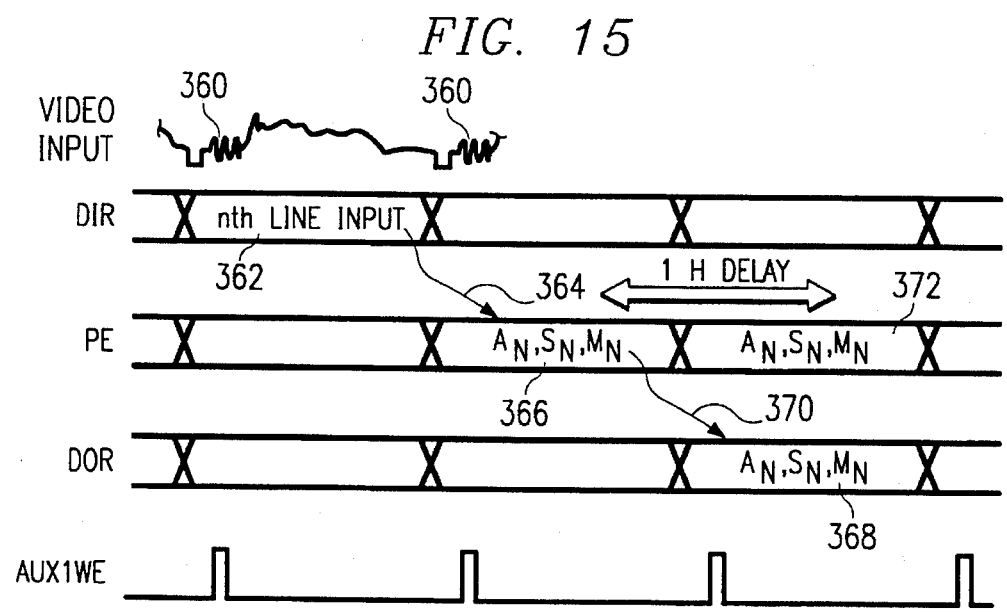
FIG. 15 illustrates a timing diagram for the overall data transfer operation from the DIR to the DOR and the Write enable signal for the auxiliary register.

Referring now to FIG. 15, there are illustrated process diagrams illustrating the processing of the nth line input through the DIR, PE and DOR. In the video input signal, the color burst is present at the beginning of the scan line, illustrated by a color burst signal 360. The video data over the entire scan line is input to the DIR, a block 362 representing the nth line input. This data is input to the DIR during the nth horizontal sync period and then, on the following horizontal blanking period, transferred to the PE and processed therein, as represented by a transfer line 364. The values of $A_N$, $S_N$ and $M_N$ are calculated during a block 366. Once the calculation is complete during this processing cycle, the data is then transferred to the DOR on the following horizontal blanking period, as indicated by a transfer line 370, and output from the DOR in a subsequent block 368. Once the values of $A_N$, $S_N$ and $M_N$ are output from the DOR, the AUXFBWE line goes high, and the values $A_N$, $S_N$ and $M_N$ are transferred to the AUXFB register 242.

The values stored in the AUXFB register 242 during the time period of the block 368 are then input back to the PE 228 via the multiplexer 240 for use by the PE 228 as a global variable in the delayed calculation of both the ACC and the color demodulation. This is represented in a block 372 in the PE processing sequence that is subsequent to the processing block 366. Therefore, in the block 372, the burst amplitude and phase values calculated in the block 366 and transferred through the block 368 are used to normalize the 1H delayed modulated-C amplitude by the ACC block 282, and to demodulate the normalized-C by the color demod block 284. However, it is important to note that the data utilized for both calculations is the same.

Referring now to FIG. 16, there is illustrated an alternate embodiment of the chroma demodulation algorithm for digital video signal processing. In this embodiment, both ACC (Automatic Chroma Gain Control) and ACK (Automatic Chroma Killer) are utilized. The modulated C-signal is input to a switch 376, which is controlled by a VTG signal. In this configuration, the modulated C-signal is input to a multiplication circuit 378 and multiplied by the value output from the LIMIT block 398 to output a normalized chroma value on a line 380. To obtain the output from the LIMIT block 398, the absolute value of the signal line 380 is obtained by a block 382 and then input to a square root circuit 384 which operates similar to the blocks 316, 318 and 320 in FIG. 9. The average is then taken in a block 386, and then the ACC REFERENCE in a subtraction block 388 is subtracted from the burst amplitude. This provides a 7-bit signal on a line 390 which is input to an ACC logic block 392. The other input of the ACC logic block 392 is an ACK output signal. The output of the ACC logic block 392 is a 2-bit output represented as a three state output, the logic diagram of the ACC logic block 392 illustrated in FIG. 16a and the logic function is illustrated in FIG. 16b. The truth table for this function is as follows:

TABLE 3

| D | E | F | MSB | LSB | = | G |
|---|---|---|-----|-----|---|---|
| 0 | 0 | 0 | 0   | 0   | = | 0 |
| 0 | 1 | 0 | 1   | 1   | = | -1 |
| 1 | 0 | 0 | 0   | 0   | = | 0 |
| 1 | 1 | 0 | 0   | 1   | = | +1 |
| X | X | 1 | 1   | 1   | = | -1 |

This 2-bit value is then transferred to DOR 230 at the following horizontal blanking period and only the value located on the center of the color-burst period is latched into the AUXFB register 242 by AUXFBWE. A chroma amplitude control value is stored in a register 394, the output thereof input to a block 396, which is operable to adjust the value in the register block 394 by either increasing it, decreasing it or do not change it, depending upon the output of the AUXFB register 242. The adjusted chroma amplitude control value is introduced to the multiplication circuit 378, after limiting by a limit block 398.

The other signal to the ACC logic block 392 is generated by controlling the switch 376 to follow an ACK path. The absolute value of the signal is taken in a block 400, which is then input to a square root block 402, similar to block 384, and then to an averaging block 404. The output of this block is then input to a killer level block to cause the ACC control signal to go to a decreased level when the burst amplitude is less than the killer level. This is represented in a block 406, the output of which is stored in a register 408 and the output of this then input to ACC logic block 392. The switch 376 switches the input to the 376b position only in the vertical blanking period of the input video signal 268. Thus, the ACK function is executed only in the vertical blanking period, and its result is held in the register 408 for a video field. The ACC function is executed every active horizontal line in the video field.

Figure 16C:
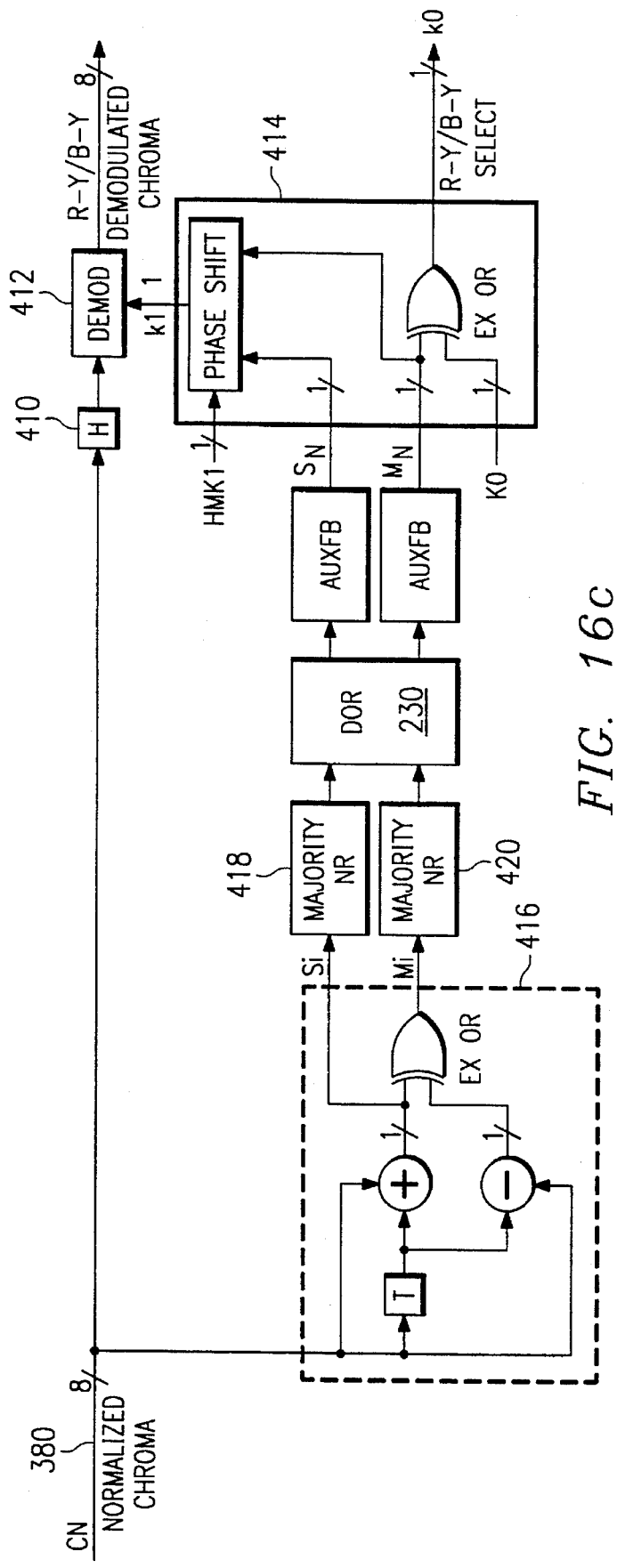
FIG. 16c illustrates a logic diagram of the Color Demodulator.

Referring now to FIG. 16c, there is illustrated a logic diagram of the Chroma Demodulator. Then output of the line 380 is delayed by one horizontal scan line in a block 410 and then input to a Color Demod block 412, similar to the Color Demod block 284. The Color Demod block 4 12 has associated therewith a phase shift circuit 4 14 similar to the phase shift circuit 358 of FIG. 14. The normalized C-signal on line 380 is input to a block 416, which provides the calculation of the color burst phase components in a manner similar to that illustrated in FIG. 12, to output the $S_i$ and $M_i$ signals. The outputs of block 416 are input to noise reduction blocks 418 and 420 to perform a noise reduction algorithm which reduces the noise of the phase components $S_i$ and $M_i$. The outputs of the noise reduction blocks 418 and 420 are transferred to DOR 230 at the following horizontal blanking period and the value located on the center of the color-burst period is latched into the AUXFB register 242 by the AUXFBWE. The outputs thereof input to the phase shift circuit 414, which operates similar to that described above with reference to FIG. 14.

The algorithm utilized for the majority of noise reduction blocks 418-420 is an algorithm that requires a cyclic signal such as that present with $S_i$ and $M_i$, wherein samples are taken along the cyclic signal at "taps" in such a manner that, without noise, the output of all the taps would be the same. By looking at a plurality of taps on either side of a given portion in a signal, a decision can be made as to the actual signal level present at the given portion. This is determined by comparing all of the portions and, if a majority are at one logic state and a minority at the other logic state, the logic state of the majority will comprise the output at the given portion, even though the given portion may be at the opposite logic state.

Figure 17:
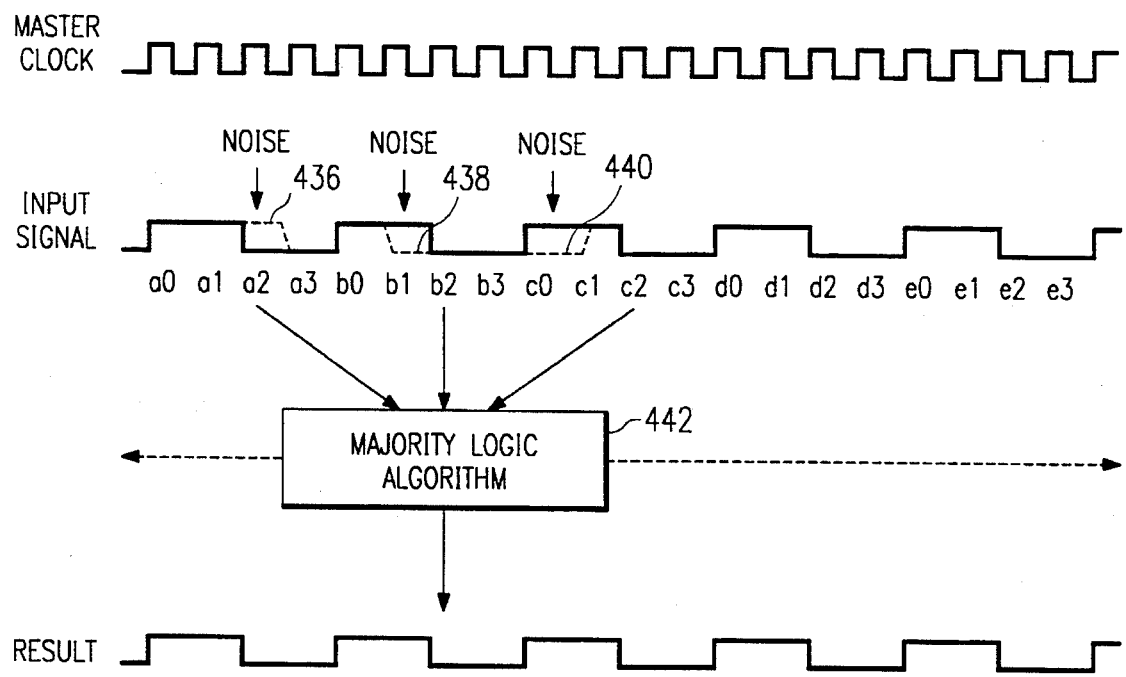
FIG. 17 illustrates a timing chart having a clock signal and an input signal.

Referring now to FIG. 17, there is illustrated a timing chart having a clock signal and an input signal. The input signal is a cyclic signal which has noise associated therewith. The input signal is cyclic with a plurality of cycles, each divided into four portions, the first two portions being a logic high and the second two portions being a logic low. The portions in the input signal are labeled a0–a3, b0–b3, c0–c3, d0–d3, etc. The input signal operates on one-fourth the clock rate of the master clock signal. The input signal is illustrated as having a potential noise level 436 associated with the portion a2, a potential noise level 38 associated with the portion b1 and an associated noise level 440 associated with both portions c0 and c1. Each of the corresponding portions in each of the cycles of the input signal are input to a decision by majority algorithm block 442 such that, in the example illustrated, three adjacent cycles are sampled, the cycle associated with the portions a0–a3, the cycle associated with the portions b0–b3 and the cycle associated with the portions c0–c3. Of course, this is only sampled during the time that a decision is being made about a portion in the cycle associated with the portions b0–b3. The algorithmic block 442 therefore receives as inputs the sampled portion in the cycle associated with the portions b0–b3 the corresponding portion in the immediately preceding cycle and the corresponding portion in the subsequent cycle.

In the example illustrated in the FIG. 17, the portion a2, the portion b2 and the portion c2 are processed by the algorithmic block 442. The algorithmic block 442 essentially determines that the logic state for the portion b2 will be the logic state of the majority of a2, b2 and c2. If, for example, a2 and c2 were at a logic "1" and portion b2 were at a logic "0", portion b2 would be forced to a logic "1". Once the logic state of b2 has been determined, the algorithmic block 442 then receives as the input the portions a3, b3 and c3 and determines the logic state of portion b3. This continues in a serial pipeline manner. This is illustrated by a result waveform or reconstructed cyclic signal output by the algorithmic block 442.

Figure 17A:
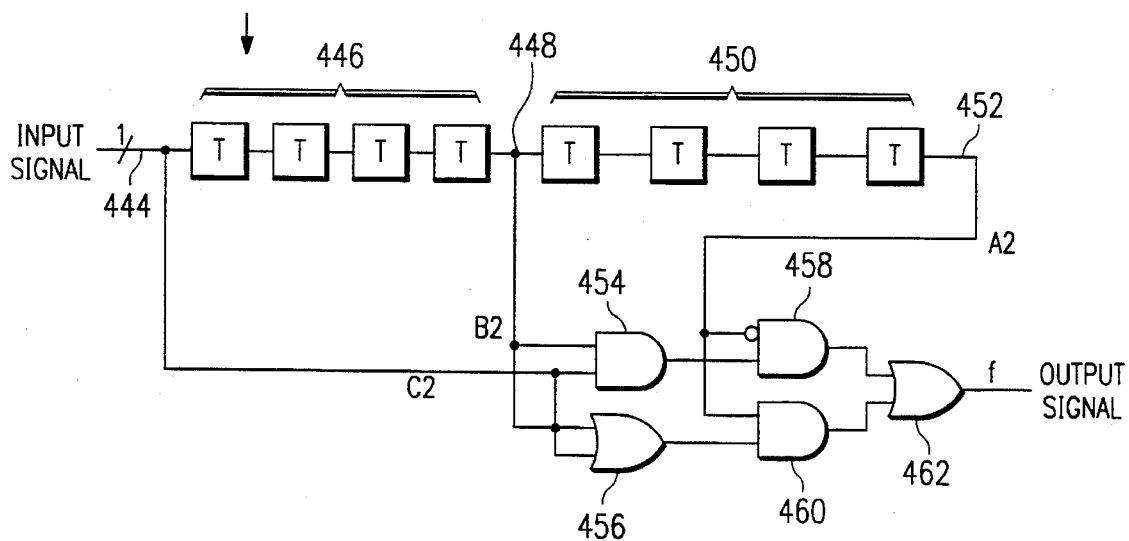
FIG. 17a illustrates a logic representation of the algorithmic block of FIG. 17.

Referring now to FIG. 17a, there is illustrated a logic representation of the algorithmic block 442. The signal input is input on a line 444, which is delayed by four delay blocks 446 for input to a node 448. The node 448 is then delayed by four delay blocks 450 for input to a node 452. The node 452 therefore comprises, in the above example, the a2 input, the node 448 comprises the b2 input and the input on line 444 comprises the portion c2. The node 452 therefore is the immediately preceding portion, the node 448 is the present portion and the node 444 is the corresponding portion in the immediately subsequent cycle.

The input line 444 is connected to one input of an AND gate 454 and one input of an OR gate 456. The node 448 is input to the other input of the AND gate 454 and the other input of the OR gate 456. The output of AND gate 454 is input to one input of an AND gate 458, and the output of OR gate 456 is input to one input of an AND gate 460. Node 452 is input to the other input of AND gate 460 and to the other input of AND gate 458 through an inverting input. The output of AND gates 458 and 460 are input to respective inputs of an OR gate 462, the output of which comprises the output of the algorithmic block 442. The logic function provided by the logic circuitry of FIG. 17a is listed in Table 4.

TABLE 4

| a2 | b2 | c2 | f2 |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Referring now to FIG. 18, there is illustrated a timing diagram for a situation where only the positive or negative portion of the cycle is looked at. The example described above utilized four portions for each cycle of the input signal. In FIG. 18, there are only two portions per input cycle, the first half of the cycle and the second half of the cycle. The input signal is illustrated as having two incorrect logic states in portions 464 and 466, which are due to noise. The logic state of portion 464 is a high logic state, whereas it should be a low logic state, represented by a phantom line 470. Similarly, a phantom line 472 represents the actual logic state of the portion 466. A majority algorithmic block 476 is operable to sample the present logic state, which is the portion 466, labelled b, the corresponding portion of the preceding cycle, labelled a, and the corresponding portion of the immediately following cycle, labelled c. The majority algorithmic block 476 is then operable to determine the logic states of each of the sampled portions and select the logic state that exists in the majority of the sampled logic states as the logic state for the portion 466. This, of course, will be a logic "1". The result is illustrated as a result waveform.

Referring now to FIG. 18a, there is illustrated a logic representation of the algorithmic block 476. The logic structure is substantially identical to that of FIG. 17a, with the exception that only a delay section 480 of two delay blocks is required between the input line 444 and the node 448, and a delay section 482 of two delay blocks is required between node 448 and node 452. The truth table is the same as that of Table 4.

Referring now to FIG. 19, there is illustrated a timing diagram wherein odd tap numbers are utilized. To improve the reliability of the noise reduction provided by the majority logic algorithm, it may be desirable to expand the tap numbers to only include the odd tap numbers such as 3, 5, 7, 9, 11, 13, . . . , there being an odd number of taps. The logic diagram of FIG. 19 illustrates use of five taps for performing the majority logic algorithm. Again, the input signal is a cyclic signal, with a portion 490, having a logic low level, whereas it should be at a logic "high" level, as represented by a phantom line 492, and a portion 494, which is at a logic "high" level, whereas it should be at the logic "low" level, as represented by a phantom line 496. Each of the cycles are divided up into two portions, one for the first half of the cycle and one for the second half of the cycle. A majority logic algorithm block 498 is operable to receive one-half of a present cycle, the corresponding one-half of the immediately preceding cycle, the corresponding one-half of the cycle that precedes the present portion by two cycles, the corresponding portion of the immediately following cycle and the corresponding portion of the cycle that will follow two cycles in the future. The logic state of the present cycle will be determined by the logic state of the majority of the portions. It can be seen that a portion 500 constitutes the present portion and that the portion 494 comprises one of the portions. The only one of the portions that has an incorrect logic state is portion 494, which is at a logic "high" state when it should be at a logic "low" state, as indicated by the phantom line 496. Therefore, four logic "lows" and one logic "high", result in a decision that the portion 500 is at a logic "low". This is represented in the result waveform. It should be noted that an odd number of inputs to the majority logic algorithmic block 498 are required when utilizing every other tap number instead of adjacent portions. The truth table for this structure is illustrated in Table 5.

TABLE 5

| a | b | c | d | e | f |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 1 |
| 0 | 1 | 0 | 0 | 0 | 0 |
| 0 | 1 | 0 | 0 | 1 | 0 |
| 0 | 1 | 0 | 1 | 0 | 0 |
| 0 | 1 | 0 | 1 | 1 | 1 |
| 0 | 1 | 1 | 0 | 0 | 0 |
| 0 | 1 | 1 | 0 | 1 | 1 |
| 0 | 1 | 1 | 1 | 0 | 1 |

TABLE 5-continued

| a | b | c | d | e | f |
|---|---|---|---|---|---|
| 0 | 1 | 1 | 1 | 1 | 1 |
| 1 | 0 | 0 | 0 | 0 | 0 |
| 1 | 0 | 0 | 0 | 1 | 0 |
| 1 | 0 | 0 | 1 | 0 | 0 |
| 1 | 0 | 0 | 1 | 1 | 1 |
| 1 | 0 | 1 | 0 | 0 | 0 |
| 1 | 0 | 1 | 0 | 1 | 1 |
| 1 | 0 | 1 | 1 | 0 | 1 |
| 1 | 0 | 1 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 1 |
| 1 | 1 | 1 | 0 | 0 | 1 |
| 1 | 1 | 1 | 0 | 1 | 1 |
| 1 | 1 | 1 | 1 | 0 | 1 |
| 1 | 1 | 1 | 1 | 1 | 1 |

Figure 20:
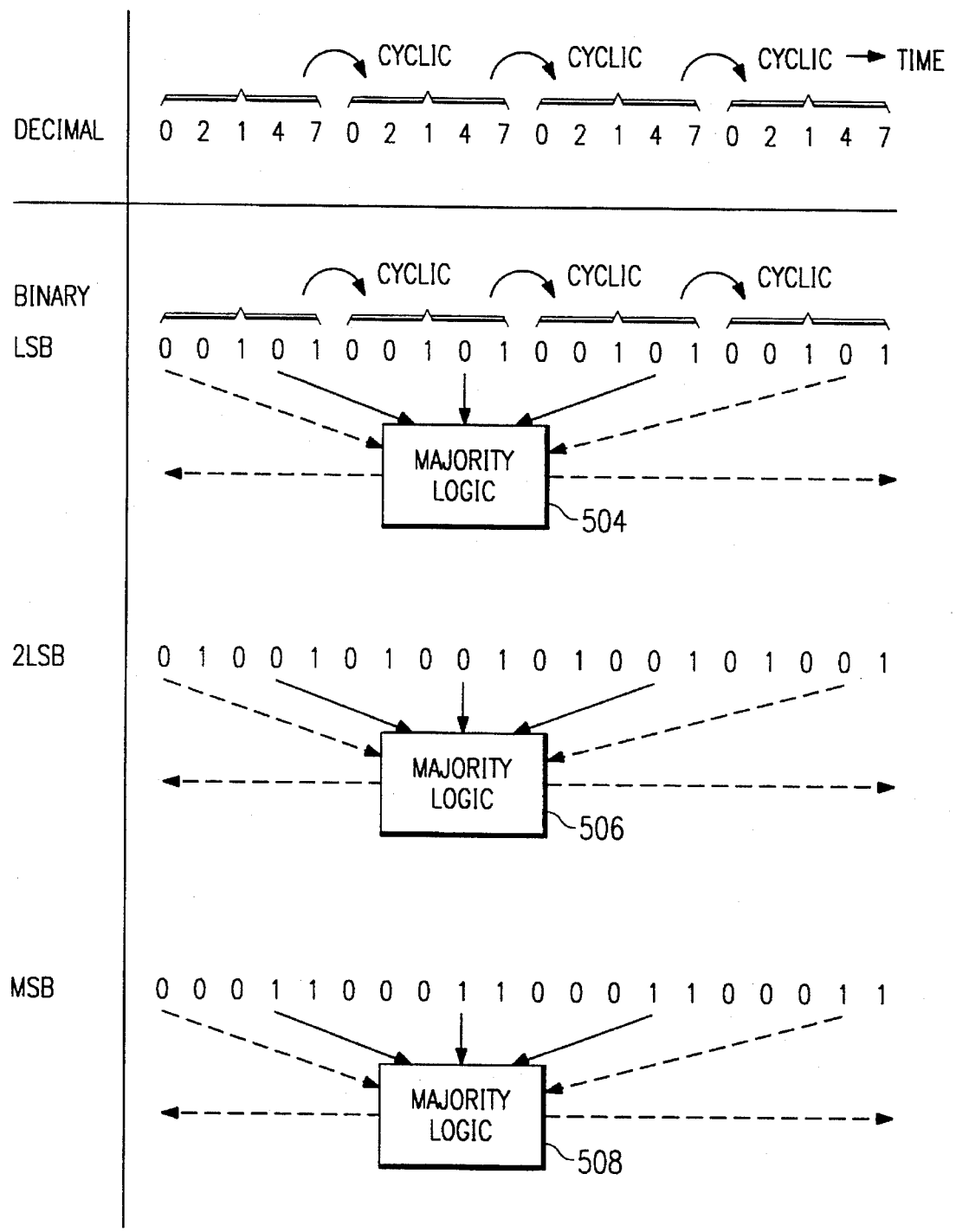
FIG. 20 illustrates ,a timing diagram for applying the majority logic algorithm to a multi-bit data stream wherein cyclic data is present.

Referring now to FIG. 20, there is illustrated a timing diagram for applying the majority logic algorithm to a multi-bit dam stream wherein cyclic data is present. The decimal equivalent of the data is illustrated wherein the value of "02147" is repeated on a cyclic basis. The binary representation is divided up into three sections of five bits each, such that there is an LSB, a 2LSB and an MSB. When the bits in the LSB are grouped together, they represent a cyclic pattern, as well as when the bits in the 2LSB and the bits in the MSB are grouped together. In this embodiment, the LSB is operated on by a majority logic algorithmic block 504, the 2LSB is operated on by a majority logic algorithmic block 506, and the MSB is operated on by a majority logic algorithmic block 508. Each of the algorithmic blocks 504–508 are operable to receive as inputs the present bit, the corresponding bits in the two previous cycles and the corresponding bits in the two following cycles. These bits should all have the same logic state and, therefore, the logic state will be the logic state of the majority of the sampled logic states input to the majority logic blocks 504–508.

A technical advantage is provided by utilizing the majority logic algorithmic block 504 in that it provides a method for an SVP to reduce noise in a cyclic signal during processing of a modulated chroma signal with a chroma demodulation algorithm. This cyclic signal is generated during the phase detector portion of the algorithm and prior to input to the phase shift circuit. Since the SVP has this cyclic signal available, the processor can compare the logic state of a given portion of one cycle to that of corresponding portions in other cycles and force the logic state to that of the majority of the portions to provide a reconstructed cyclic signal. This reconstructed cyclic signal is used in the remaining processing of the demodulation algorithm to provide a noise corrected signal.

Although the preferred embodiment has been described in detail, it should be understood that various changes, substitutions and alterations can be made therein without departing from the spirit and scope of the invention as defined by the appended claims.

What is claimed is:

1. A method for reconstructing a corrupted binary cyclic signal with digital logic circuitry, said binary cyclic signal regularly switching between a first logic state and a second logic state at a predetermined frequency, said method comprising the steps of:

dividing each cycle of the corrupted binary cyclic signal into portions according to the predetermined frequency;

comparing the logic states of each portion in each cycle to a corresponding portion in at least two other cycles in the corrupted binary cyclic signal, said at least two other cycles having a predetermined temporal relationship to said cycle in each comparison;

determining the logic state of the majority of the compared portions; and generating a reconstructed binary cyclic signal corresponding to the corrupted binary cyclic signal, wherein the logic state of each portion comprises the determined logic state in the step of determining.

2. The method of claim 1, wherein the number of portions compared in the step of comparing is an odd number.

3. The method of claim 1, wherein the step of comparing is operable to compare the logic state of each portion in each of the cycles with at least a corresponding portion in a preceding cycle and a corresponding portion in a subsequent cycle.

4. The method of claim 3, wherein the number of portions is an odd number.

5. The method of claim 1, wherein the compared portions are from adjacent cycles.

6. A method for reconstructing corrupted binary cyclic signals, said binary cyclic signal regularly switching between a first logic state and a second logic state at predetermined frequency, said method comprising:

sampling a predetermined number of equally time-spaced portions in the binary cyclic signal to provide sampled portions, each of said sampled portions having corresponding portions in respective cycles of the binary cyclic signal;

comparing the each of the sampled portions of each cycle with other of the sampled portions of other cycles and determining the logic state of the majority of the compared ones of the sampled portions, said other cycles having a predetermined temporal relationship to said cycle in each comparison; and generating a reconstructed signal corresponding to the corrupt binary cyclic signal wherein the logic state of each of the sampled portions is forced to correspond to the determined logic state of the majority decision in the step of comparing.

7. The method of claim 6, wherein the number of the sampled portions compared in the step of comparing is an odd number for each of the comparison operations.

8. The method of claim 6, wherein the step of comparing is operable to compare the logic state of each of the sampled portions with the logic state of other of the sampled portions proximate thereto in order to determine the logic state of the majority of the compared ones of sampled portions, and the step of generating the reconstructed cyclic signal is operable to force the logic state of each of the sampled portions to the determined logic state of the majority of the compared sampled portions.

9. The method of claim 8, wherein the step of comparing is operable to compare the logic state of each of the sampled portions with at least the preceding one of the sampled portions and at least a subsequent one of the sampled portions during the step of comparing.

10. A method for receiving a video signal, comprising the steps of:

receiving a video input signal on a video input;

providing a digital processor;

processing the video input signal with the digital processor by converting at least a portion of the received video input signal to a digital video input signal, the digital processor operable to process the digital video signal with a predetermined processing algorithm to generate a binary color burst signal having a plurality of cycles regularly switching between a first or a second logic state at a predetermined frequency, the binary color burst signal being corrupted;

the step of processing in accordance with said processing algorithm operable to reconstruct the corrupted binary color burst signal by the steps of:

partitioning each cycle of the binary color burst signal into portions according to said predetermined frequency, comparing the logic states of each portion in each cycle of the binary color burst signal to a corresponding portion in at least two other cycles in the binary color burst signal, said at least two other cycles having a predetermined temporal relationship to said cycle in each comparison, determining the logic state of the majority of the compared portions, and generating said reconstructed cyclic binary color burst signal corresponding to the corrupted cyclic binary color burst signal, wherein the logic state of each portion in the reconstructed cyclic binary color burst signal comprises the determining logic state as determined in the step of determining; and providing a video output device for outputting a video output signal after processing thereof by the digital processor.

11. The method of claim 10, wherein the step of receiving the video input signal comprises receiving an analog video input signal and the step of outputting the video output signal comprises converting the digital output of the digital processor to an analog video output signal and outputting the analog video output signal from the video output device.

12. The method of claim 10, wherein the video input signal is an analog video input signal and the step of processing the video input signal with the digital processor includes the steps of:

converting the analog video input signal to a digital video input signal;

storing the digital video input signal in a data input register; and transferring the stored digital video input signal from the data input register to the digital processor for processing thereof in accordance with the predetermined processing algorithm.

13. The method of claim 10, wherein the step of processing the digital video input signal with the signal processor further comprises processing the corrupted binary cyclic signal in accordance with the predetermined processing algorithm to provide output data and transferring the output data from the digital processor to an output data register.

14. The method of claim 10, wherein the number of portions compared in the step of comparing is an odd number.

15. The method of claim 10, wherein the step of comparing is operable to compare the logic state in each portion of each cycle to at least a corresponding portion of a preceding cycle and a corresponding portion of a subsequent cycle.

16. The method of claim 10, wherein the compared portions in the step of comparing are from adjacent cycles.

17. A processing system for reconstructing a corrupted binary cyclic signal with digital logic circuitry, said binary cyclic signal regularly switching between a first logic state and a second logic state at a predetermined frequency, said method comprising:

a partitioning device for partitioning each cycle of the binary cyclic signal into portions according to the predetermined frequency;

a comparator for comparing the logic states of each portion in each cycle of the binary cyclic signal to a corresponding portion in at least two other cycles in the binary cyclic signal, said at least two other cycles having a predetermined temporal relationship to said cycle in each comparison;

a logic device for determining the logic state of the majority of the compared portions; and an output device for generating a reconstructed binary cyclic signal corresponding to the binary cyclic signal, wherein the logic state of each portion in said reconstructed binary cyclic signal comprises the determined logic state as determined in said logic device.

18. The system of claim 17, wherein the number of portions compared in said comparator is an odd number.

19. The system of claim 17, wherein said comparator is operable to compare the logic state of each portion in each of the cycles with at least a corresponding portion in a preceding cycle and a corresponding portion in a subsequent cycle.

20. The system of claim 19, wherein the number of portions is an odd number.

21. The system of claim 17, wherein the compared portions in said comparator are from adjacent cycles.

22. A processing system for reconstructing corrupted binary cyclic signals, said binary cyclic signal regularly switching between a first logic state and a second logic state at a predetermined frequency, said method comprising:

sampling circuitry for sampling a predetermined number of equally time-spaced portions in the binary cyclic signal according to the predetermined frequency to provide sampled portions, each of said sampled portions having corresponding portions in respective cycles of the binary cyclic signal;

comparator circuitry for comparing said sampled portions of each cycle with sampled portions of other cycles and determining the logic state of the majority of the compared ones of said sampled portions, said other cycles having a predetermined temporal relationship to said cycle in each comparison; and reconstruction circuitry for generating a reconstructed binary cyclic signal corresponding to the corrupted binary cyclic signal wherein the logic state of each of the sampled portions is forced to correspond to the predetermined logic state of the majority decision of said comparator circuitry.

23. The processing system of claim 22, wherein the number of said sampled portions compared in said comparator circuitry is an odd number.

24. The processing system of claim 22, wherein said comparator circuitry is operable to compare the logic state of each of said sampled portions with the logic state of other of said sampled portions proximate thereto to determine the logic state of the majority of the compared ones of said sampled portions for said one sampled portion and said reconstruction circuitry is operable to force the logic state of each of said sampled portions to the determined logic state of the majority of said compared sampled portions.

25. The processing system of claim 24, wherein said comparator circuitry is operable to compare the logic state of each of said sampled portions with at least a preceding one of said sampled portions and at least a subsequent one of said sampled portions.

26. The processing system of claim 22, wherein said sampling circuitry comprises a pipeline circuit having a plurality of taps separated by a predetermined number of discrete delays, each of said discrete delays comprising a cycle of the corrupted cyclic signal, the output of each of said taps comprising said sampled portions and wherein said comparator circuitry comprises a comparator for receiving the output for each of said taps from said pipeline circuit and outputting a logic state that represents the logic state of the majority of the inputs to said comparator.

27. A video signal receiving system, comprising:
a video input for receiving a video input signal; a digital processor for converting at least a portion of said received video input signal to a digital video signal, said digital processor for processing said digital video signal with a predetermined processing algorithm to generate a corrupted binary color burst signal having a plurality of cycles regularly switching between a first or a second logic state at a predetermined frequency;
said digital processor having:
a partitioning device for partitioning each cycle of the binary color burst signal into portions according to said predetermined frequency,
a comparator for comparing the logic states of each portion in each cycle of the cyclic binary color burst signal to a corresponding portion in at least two other cycles in the cyclic binary color burst signal, said at least two other cycles having a predetermined temporal relationship to said cycle in each comparison,
a logic device for determining the logic state of the majority of the compared portions, and
an output device for generating a reconstructed binary color burst signal corresponding to the corrupted cyclic binary color burst signal, wherein the logic state of each portion in said reconstructed binary color burst signal comprises the determined logic state as determined in said logic device; and
a video output device for outputting a video output signal after processing thereof by said digital processor.

28. The receiving system of claim 27, wherein said video input signal is an NTSC video input signal and said video output device is operable to convert the digital output of said digital processor to an analog video output signal.

29. The processing system of claim 27, wherein said video input signal is an analog video input signal and said digital processor includes:
conversion circuitry for converting said analog video input signal to a digital input signal;
a data input register for receiving and storing said digital input signal; and
a first transfer device for transferring the stored input digital signal from said data input register to said digital processor for processing thereof in accordance with said predetermined processing algorithm.

30. The receiving system of claim 29, wherein said digital processor is further operable to process said corrupted cyclic signal in accordance with said predetermined processing algorithm to provide output data and further comprising an output data register and a second transfer device for transferring said output data from said digital processor to said output data register.

31. The receiving system of claim 27, wherein the number of portions compared in said comparator is an odd number.

32. The receiving system of claim 27, wherein said comparator is operable to compare the logic state of each portion in each cycle of at least a corresponding portion in a preceding cycle and at least a corresponding portion in a subsequent cycle.

33. The receiving system of claim 27, wherein the compared portions in said comparator are from adjacent cycles.

34. The method of claim 1, wherein:
said step of comparing the logic states in each cycle to a corresponding portion of at least two other cycles compares three cycles;
said step of determining the logic state of the majority of the compared portions consists of forming the logic operation ((B AND C) AND NOT(A)) OR ((B OR C) AND A), where A, B and C are respective first, second and third of said three cycles.

35. The method of claim 6, wherein:
said step of sampling a predetermined number of equally time-spaced portions in the binary cyclic signal samples three time-spaced portions;
said step of determining the logic state of the majority of the compared ones of the sampled portions consists of forming the logic operation ((B AND C) AND NOT(A)) OR ((B OR C) AND A), where A, B and C are respective first, second and third of said three time-spaced portions.

36. The method of claim 10, wherein:
said step of processing in accordance with said processing algorithm operable to reconstruct the corrupted binary color burst signal wherein
said step of comparing the logic states in each cycle to a corresponding portion of at least two other cycles compares three cycles,
said step of determining the logic state of the majority of the compared portions consists of forming the logic operation ((B AND C) AND NOT(A)) OR ((B OR C) AND A), where A, B and C are respective first, second and third of said three cycles.

37. The system of claim 17, wherein:
said partitioning device includes a delay device having first and second output taps receiving the corrupted cyclic binary signal at an input and producing a first output delayed one cycle of the predetermined frequency at said first output tap and a second output delayed two cycles of the predetermined frequency at said second output tap;
said comparator connected to said delay device for receiving said first output and said second output, and receiving the corrupted binary cyclic signal;
said logic device consists of
a first AND gate having a first input receiving the corrupted cyclic binary signal, a second input connected to said first output of said delay device and an output,
a first OR gate having a first input receiving the corrupted cyclic binary signal, a second input connected to said first output of said delay device and an output,
a second AND gate having a first input receiving an inversion of said second output of said delay device, a second input connected to said output of said first AND gate and an output,
a second OR gate having a first input connected to said second output connected to said second output of said delay device and an output, and
a third OR gate having a first input connected to said output of said second AND gate, a second input connected to said output of said second OR gate and an output, said output determining the logic state of the majority of the corrupted cyclic binary signal, said first output of said delay device and said second output of said delay device.

38. The receiving system of claim 27, wherein:

said partitioning device includes a delay device having first and second output taps receiving the corrupted cyclic binary signal at an input and producing a first output delayed one cycle of the predetermined frequency at said first output tap and a second output delayed two cycles of the predetermined frequency at said second output tap;

said comparator connected to said delay device for receiving said first output and said second output, and receiving the corrupted binary cyclic signal;

said logic device consists of a first AND gate having a first input receiving the corrupted cyclic binary signal, a second input connected to said first output of said delay device and an output, a first OR gate having a first input receiving the corrupted cyclic binary signal, a second input connected to said first output of said delay device and an output, a second AND gate having a first input receiving an inversion of said second output of said delay device, a second input connected to said output of said first AND gate and an output, a second OR gate having a first input connected to said second output connected to said second output of said delay device and an output, and a third OR gate having a first input connected to said output of said second AND gate, a second input connected to said output of said second OR gate and an output, said output determining the logic state of the majority of the corrupted cyclic binary signal, said first output of said delay device and said second output of said delay device.

* * * * *